US011959663B2

(12) United States Patent
Barbano et al.

(10) Patent No.: US 11,959,663 B2
(45) Date of Patent: Apr. 16, 2024

(54) ELECTRICAL HEATER DEVICE, IN PARTICULAR HAVING A PTC EFFECT

(71) Applicant: ELTEK S.P.A., Casale Monferrato (IT)

(72) Inventors: Alberto Barbano, Casale Monferrato (IT); Marco Bizzarro, Casale Monferrato (IT); Luca Costa, Casale Monferrato (IT); Luca Vercellotti, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 595 days.

(21) Appl. No.: 17/056,261

(22) PCT Filed: May 17, 2019

(86) PCT No.: PCT/IB2019/054089
§ 371 (c)(1),
(2) Date: Nov. 17, 2020

(87) PCT Pub. No.: WO2019/220402
PCT Pub. Date: Nov. 21, 2019

(65) Prior Publication Data
US 2021/0215393 A1 Jul. 15, 2021

(30) Foreign Application Priority Data

May 18, 2018 (IT) .................. 102018000005496

(51) Int. Cl.
*F24H 9/18* (2022.01)
*F24H 1/00* (2022.01)
(Continued)

(52) U.S. Cl.
CPC ........... *F24H 9/1872* (2013.01); *F24H 1/009* (2013.01); *F24H 1/185* (2013.01); *H05B 3/03* (2013.01);
(Continued)

(58) Field of Classification Search
CPC ...... F24H 9/1872; F24H 9/1827; F24H 1/009; F24H 2250/04; F24H 1/185; H05B 3/03;
(Continued)

(56) References Cited

U.S. PATENT DOCUMENTS 4,177,376 A 12/1979 Horsma et al.
4,314,231 A * 2/1982 Walty .................... H01C 7/027
338/334

(Continued)

FOREIGN PATENT DOCUMENTS

WO WO-2009040774 A1 * 4/2009 ............. C08J 3/201

OTHER PUBLICATIONS

International Search Report and Written Opinion of the ISA for PCT/IB2019/054089, dated Aug. 5, 2019, 14 pages.

*Primary Examiner* — Justin C Dodson
(74) *Attorney, Agent, or Firm* — Nixon & Vanderhye P.C.

(57) ABSTRACT

An electrical heater device comprises an heating element, which includes two electrodes and a heating body made of a polymer-based material having a PTC effect, in contact with the electrodes. Each electrode comprises a meshed structure, which extends in a length direction and in a width direction, and is embedded at least partially in the heating body. Each electrode further comprises an electrical-distribution element which is fixed to the meshed structure and includes a distribution portion that extends in the length direction, or in the width direction, or in both the length and width directions of the meshed structure.

14 Claims, 21 Drawing Sheets

(51) Int. Cl.
*F24H 1/18* (2022.01)
*F24H 9/1863* (2022.01)
*H05B 3/03* (2006.01)
*H05B 3/28* (2006.01)

(52) U.S. Cl.
CPC ......... *H05B 3/286* (2013.01); *H05B 2203/02* (2013.01); *H05B 2203/021* (2013.01)

(58) Field of Classification Search
CPC ............... H05B 3/286; H05B 2203/02; H05B 2203/021
See application file for complete search history.

(56) References Cited

U.S. PATENT DOCUMENTS

| | | | |
|---|---|---|---|
| 4,700,054 A | | 10/1987 | Triplett et al. |
| 5,140,297 A | | 8/1992 | Jacobs et al. |
| 6,181,874 B1 | * | 1/2001 | Ireland ................ H05B 3/82 |
| | | | 392/398 |
| 2005/0173414 A1 | * | 8/2005 | Ishii .................... H01C 17/065 |
| | | | 219/505 |
| 2007/0189741 A1 | * | 8/2007 | Gruetzmann ............ H05B 3/42 |
| | | | 392/485 |
| 2008/0099464 A1 | | 5/2008 | Neiderer et al. |
| 2010/0072186 A1 | * | 3/2010 | Schehr ................. F24H 3/0429 |
| | | | 219/217 |
| 2011/0062137 A1 | * | 3/2011 | Wu ........................ F24H 1/009 |
| | | | 219/202 |
| 2015/0168014 A1 | * | 6/2015 | Wu ........................ F24H 3/002 |
| | | | 219/202 |
| 2018/0027614 A1 | * | 1/2018 | De Luca ............. H05B 6/6408 |
| | | | 219/528 |

* cited by examiner

Fig. 6
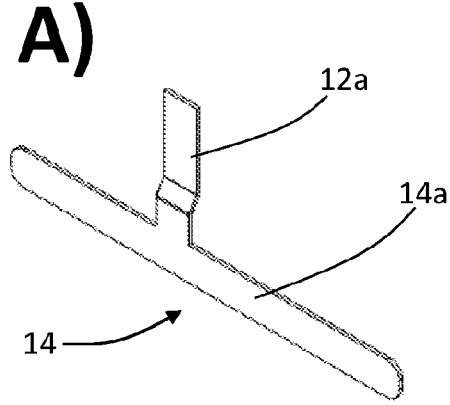
A)
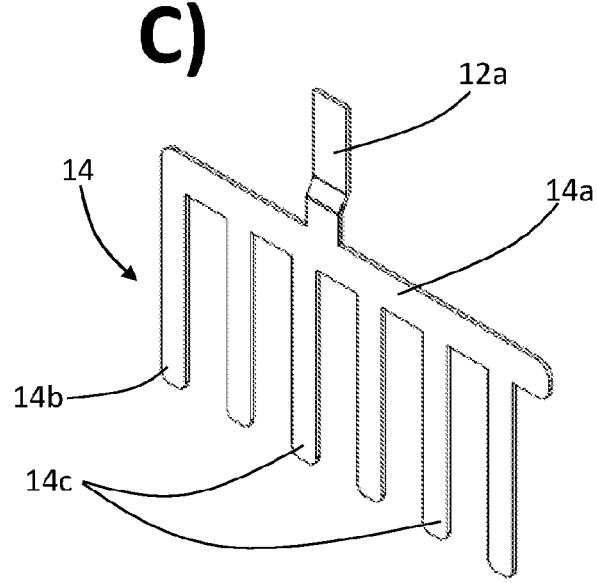
C)
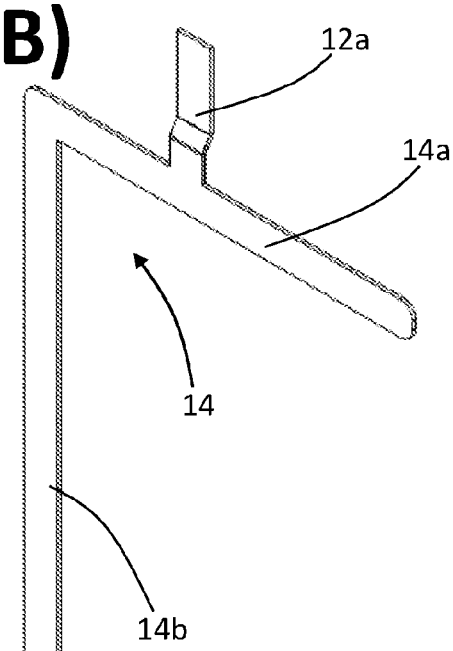
B)
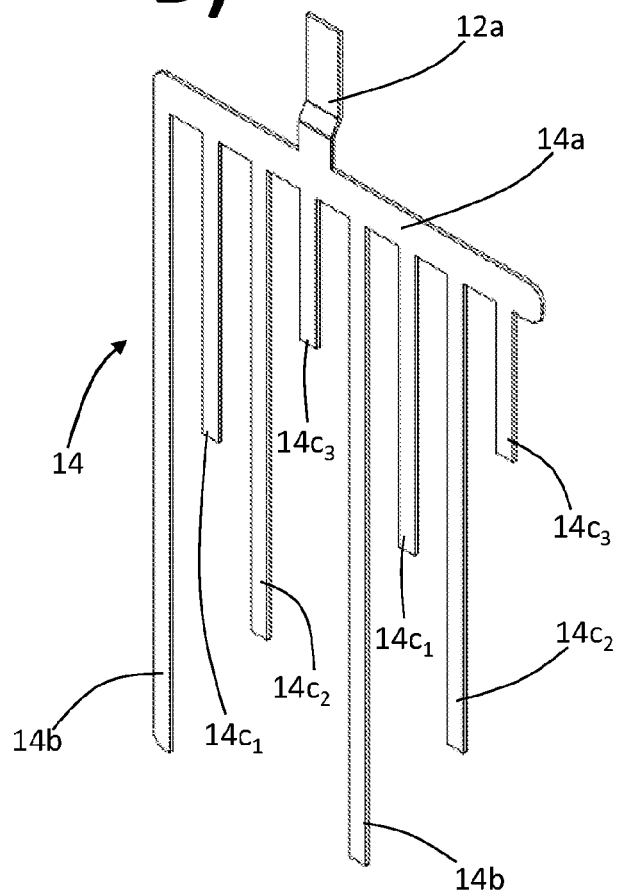
D)

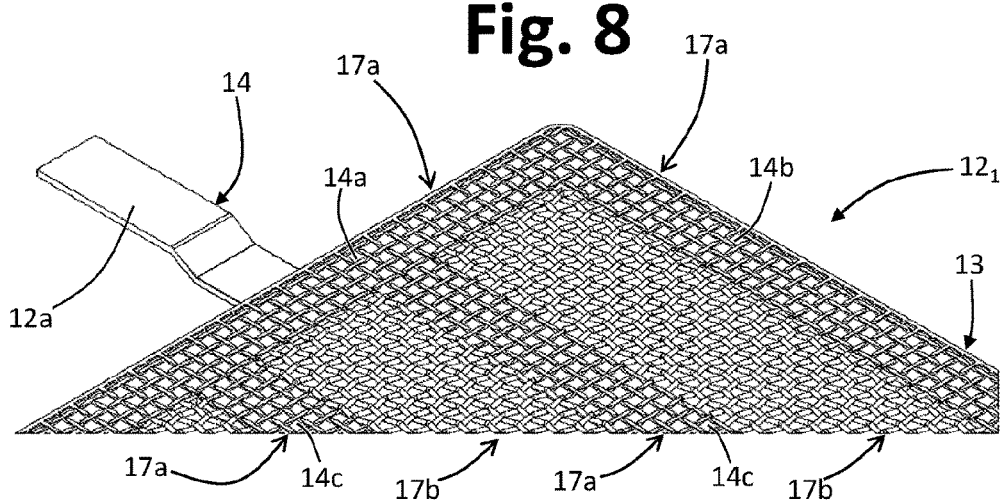
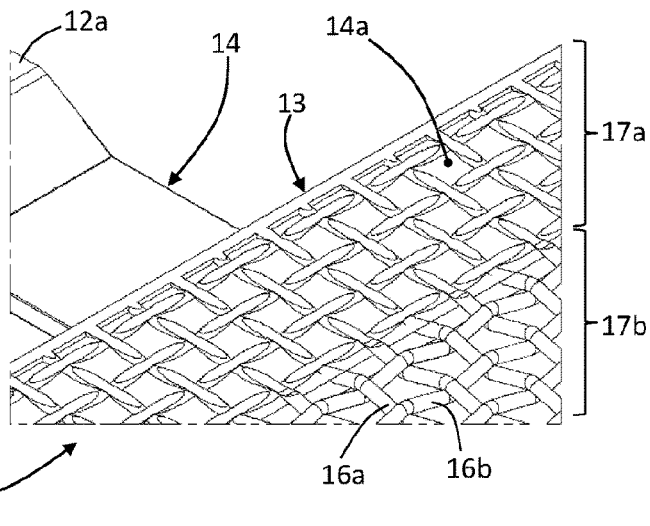
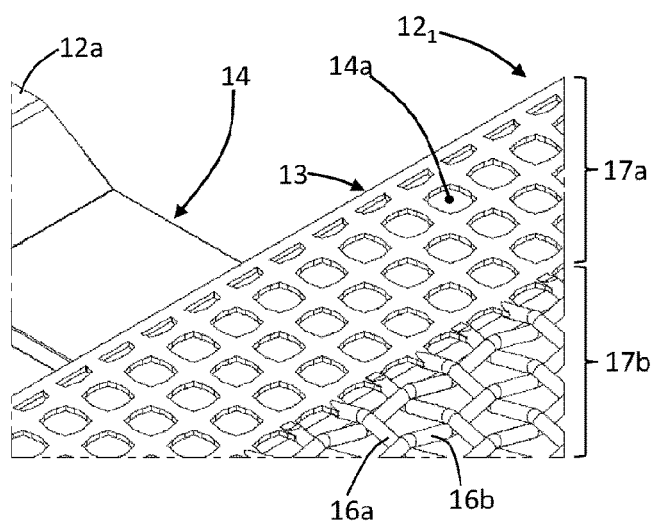

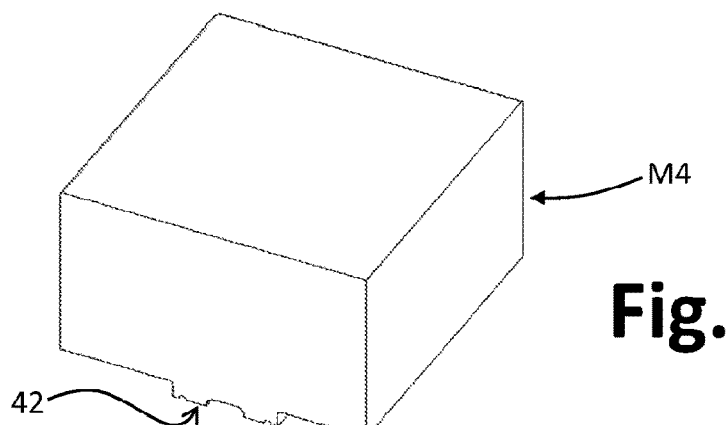
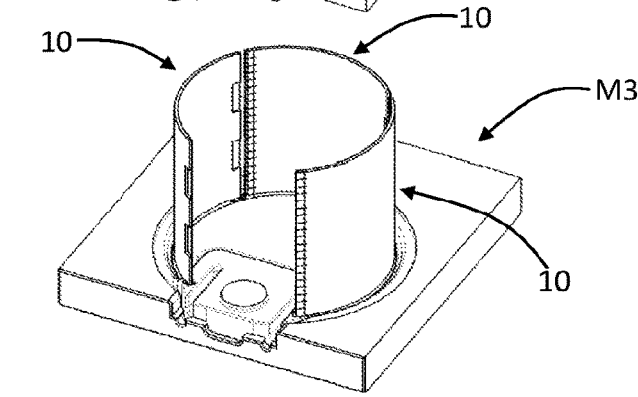
Fig. 14
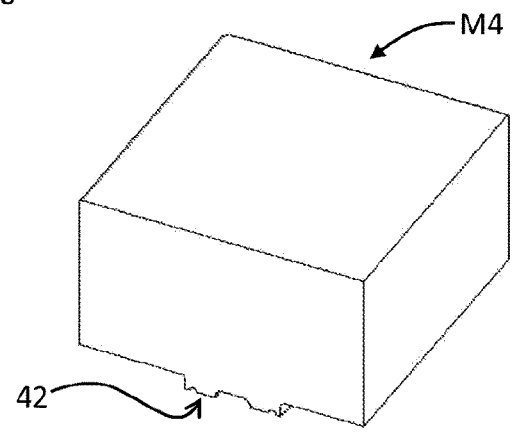
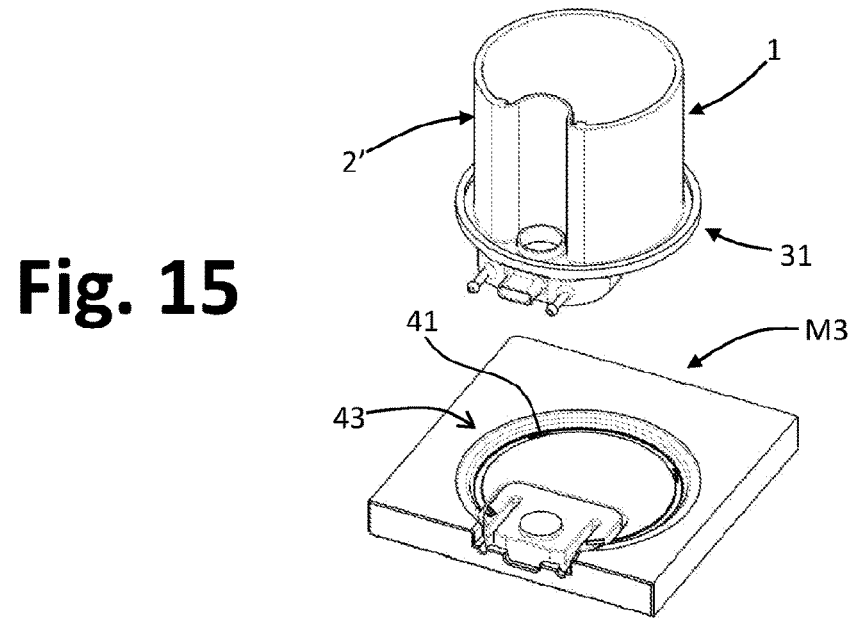
Fig. 15

ELECTRICAL HEATER DEVICE, IN PARTICULAR HAVING A PTC EFFECT

This application is the U.S. national phase of International Application No. PCT/IB2019/054089 filed 17 May 2019, which designated the U.S. and claims priority to IT Patent Application No. 102018000005496 filed 18 May 2018, the entire contents of each of which are hereby incorporated by reference.

FIELD OF THE INVENTION

The present invention relates to electrical heater devices, in particular devices based upon the use of materials distinguished by an electrical resistance with positive temperature coefficient, i.e., ones having a PTC effect, preferably materials of a polymeric type, i.e., polymer-based materials or materials that include at least one polymer.

The invention has been developed with particular reference to electrical heater devices that are to be associated or integrated in vehicle components, such as heaters for tanks or reservoirs, heaters for filters, heaters for fluid ducts, heaters for batteries, heaters for substances that are subject to freezing or that vary their characteristics as a function of temperature, or again heaters used for heating aeriforms, such as air for environments or air subject to forced circulation on the surface of the aforesaid heaters.

The invention finds preferred application in the sector of components of tanks or ducts that are to come into contact with a liquid, for example a liquid necessary for operation of an internal-combustion engine or operation of a system for the treatment or reduction of exhaust gases of an internal-combustion engine, including Water-Injection or Anti-Detonant Injection systems. The heater devices according to the invention may in any case also find application in contexts different from the preferential ones referred to above.

PRIOR ART

WO 2017/077447 A, upon which the preamble of Claim 1 is based, discloses an electrical heater device of the type referred to, which comprises a plurality of heating elements integrated in a component of a motor-vehicle tank. Each heating element includes a heating body made of a polymeric material having a PTC effect, set between two parallel electrodes and in contact therewith. The electrodes are in the form of a metal foil, are substantially the same as one another, and are possibly provided with holes, and substantially coat the two opposite major faces of the heating body, which has the shape of a substantially parallelepipedal layer.

This type of structure of the heating element is efficient from the standpoint of heat emission, thanks to the fact that the wide parallel surfaces of the laminar electrodes coat practically entirely the opposite surfaces of the mass of material with PCT effect: in this way, the uniformity and the intensity of the electric current between the electrodes themselves are guaranteed, and hence a good heating power.

It has, however, been found that, in particular over the long term, heater devices may be affected by problems linked to deformation (for example, expansion and contraction) of the PTC-effect material and/or of the corresponding metal electrodes, due to the cycles of heating and cooling. Such deformations may lead to relative movements between the parts made of different materials, with possible risks of delamination or peeling of the electrodes off the corresponding faces of the heating body made of the material with PTC effect, with consequent decay of the operating characteristics of the device.

AIM AND SUMMARY OF THE INVENTION

In view of what has been set forth above, the present invention has basically the aim of overcoming or at least limiting the aforesaid drawback of the prior art, by means of an electrical heater device built in a way that is as a whole simple, inexpensive, and reliable. The above and other aims still, which will emerge clearly hereinafter, are achieved according to the present invention by an electrical heater device, a motor-vehicle component, and a method for obtaining an electrical heater device that have the characteristics specified in the annexed claims. The claims form an integral part of the technical teaching provided herein in relation to the invention.

BRIEF DESCRIPTION OF THE DRAWINGS

The characteristics, advantages, and further objects of the present invention will emerge clearly from the ensuing detailed description, with reference to the annexed drawings, which are provided purely by way of non-limiting example and in which:

FIG. 6 represents schematically, via perspective views, possible alternative configurations of a part of an electrode of a heater device according to possible embodiments of the invention;

FIG. 8 is a detail at a larger scale of FIG. 5;

FIG. 9 is a detail at a larger scale of FIG. 8;

FIG. 10 is a view similar to that of FIG. 9, regarding a variant embodiment of the invention;

FIGS. 14 and 15 are schematic representations of a second process for obtaining a casing body of a heater device according to possible embodiments of the invention;

DESCRIPTION OF PREFERRED EMBODIMENTS OF THE INVENTION

Reference to "an embodiment" or "one embodiment" within the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Moreover, particular conformations, structures, or characteristics defined within this description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments. In the present description and in the attached claims, the generic term "material" is to be understood as including mixtures, compositions, or combinations (for example, multilayer structures) of a number of different materials. In the present description and in the attached claims, the term "meshed structure" or "net structure" is understood as indicating a structure formed by the criss-crossing or interweaving of substantially filiform elements, preferably threads or wires, for example like a net, a mesh, a weave, etc.

Figure 1:
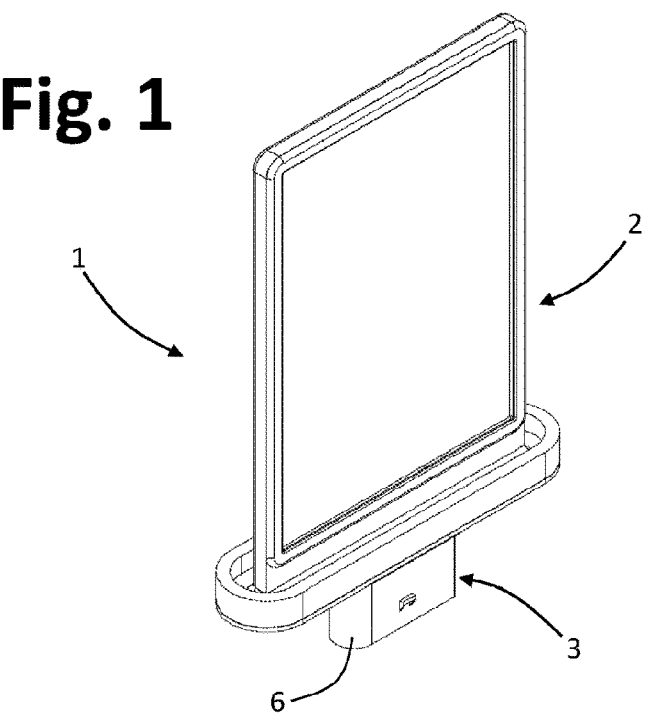
FIG. 1 is a schematic perspective view of a heater device according to possible embodiments of the invention.

With initial reference to FIG. 1, designated as a whole by 1 is a heater device according to possible embodiments of the invention. In what follows, it is to be assumed that the device 1 belongs to a system on board a motor vehicle, for example a system for heating a stream of air or for heating a liquid that is contained in a tank or reservoir, or that passes through a duct.

Figure 2:
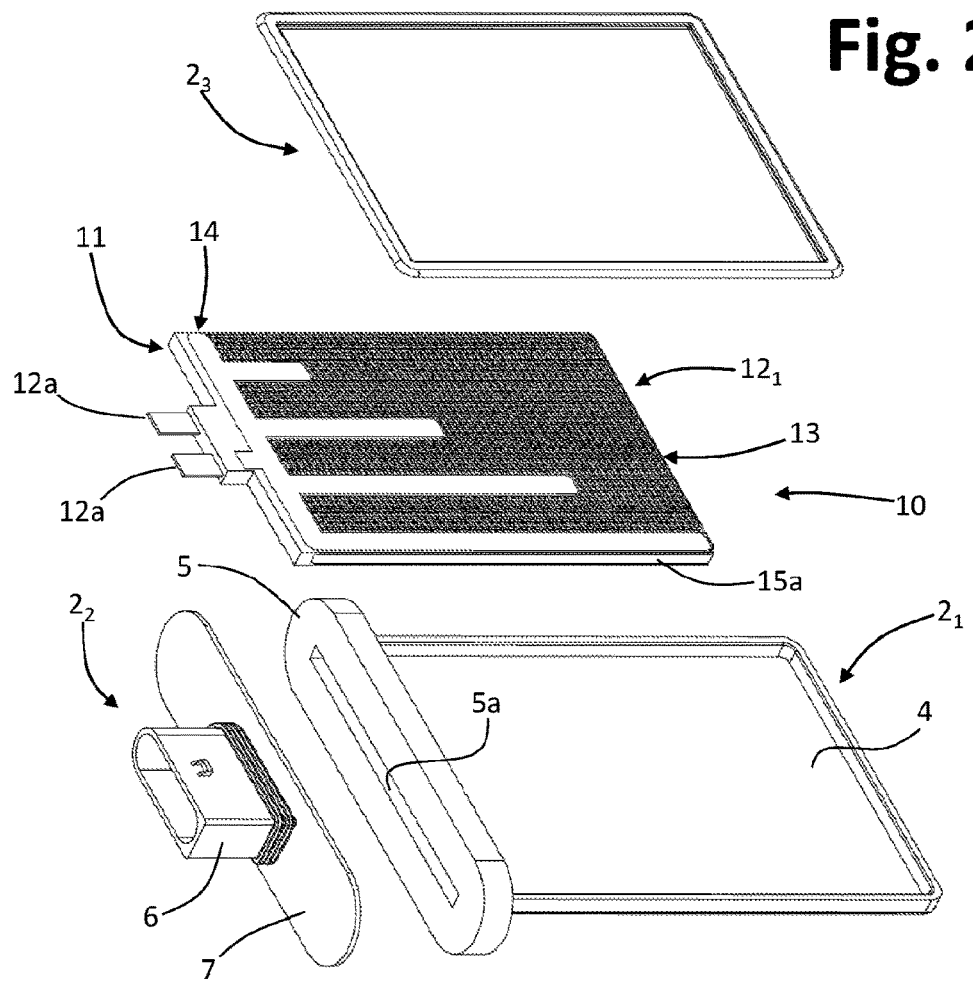
FIG. 2 is a partially exploded schematic view of a heater device according to possible embodiments of the invention.

The device 1 comprises a casing body 2, which encloses at least partially at least one heating element, designated as a whole by 10 in FIG. 2. The casing body 2 is preferentially provided with an electrical connector 3 for connection to an electric power source.

In various embodiments, the casing body of the heater device according to the invention is made up of two or more parts fixed to one another, whereas in other embodiments the casing body is formed at least in part via overmoulding of material on at least one heating element of the device. The casing body may be of a hermetic type, i.e., devised for enclosing in a fluid-tight way the heating element or elements of the device.

In various embodiments, the heater device forming the subject of the invention is configured as a stand-alone component, in which case its casing body is preferentially configured for installation and/or fixing in a more complex system, for example, the heating system of a motor-vehicle. In other embodiments, the device forming the subject of the invention is instead integrated in a component prearranged for performing also functions different from heating of a generic medium, in which case at least part of a body of the component can be exploited for providing at least in part also the casing body of the heater device. In other applications still, the device does not need a casing body of its own, for example when a corresponding heating element is exposed directly in a given environment for heating it.

In the case exemplified in FIGS. 1 and 2, the device 1 is configured as a stand-alone component, and its casing body 2 consists of three parts $2_1$, $2_2$, and $2_3$, for example made of electrically insulating thermoplastic material, which can be fixed to one another, preferably in a sealed way, for example via gluing or welding or hooking, in order to enclose within it at least part of the heating element 10.

Once again with reference to the case exemplified in FIGS. 1 and 2, the casing part designated by $2_1$ has a substantially boxlike structure, which defines a seat 4 for housing the heating element 10 completely or mostly inside it. In the case exemplified, the casing part $2_1$ has a flange-shaped front portion 5, provided with a slit 5a through which the element 10 can be inserted in a transverse direction in the seat 4, so that two electrical-connection terminals 12a, which belong or are connected to respective electrodes of the heating element 10 (just one of which is visible in FIG. 2, designated by $12_1$), project at the front beyond the portion 5. Fixed at the front to the front portion 5 is the casing part designated by $2_2$, which defines a connector body 6 configured for receiving within it the terminals 12a and thereby providing the connector 3 of FIG. 1. In the example represented, the casing part $2_2$ further comprises a flange-shaped portion 7, designed to close the slit 5a.

In the example, the seat 4 can be closed via the casing part designated by $2_3$, which basically functions as lid for the aforesaid seat, and is fixed peripherally to the casing part $2_1$.

Figure 3:
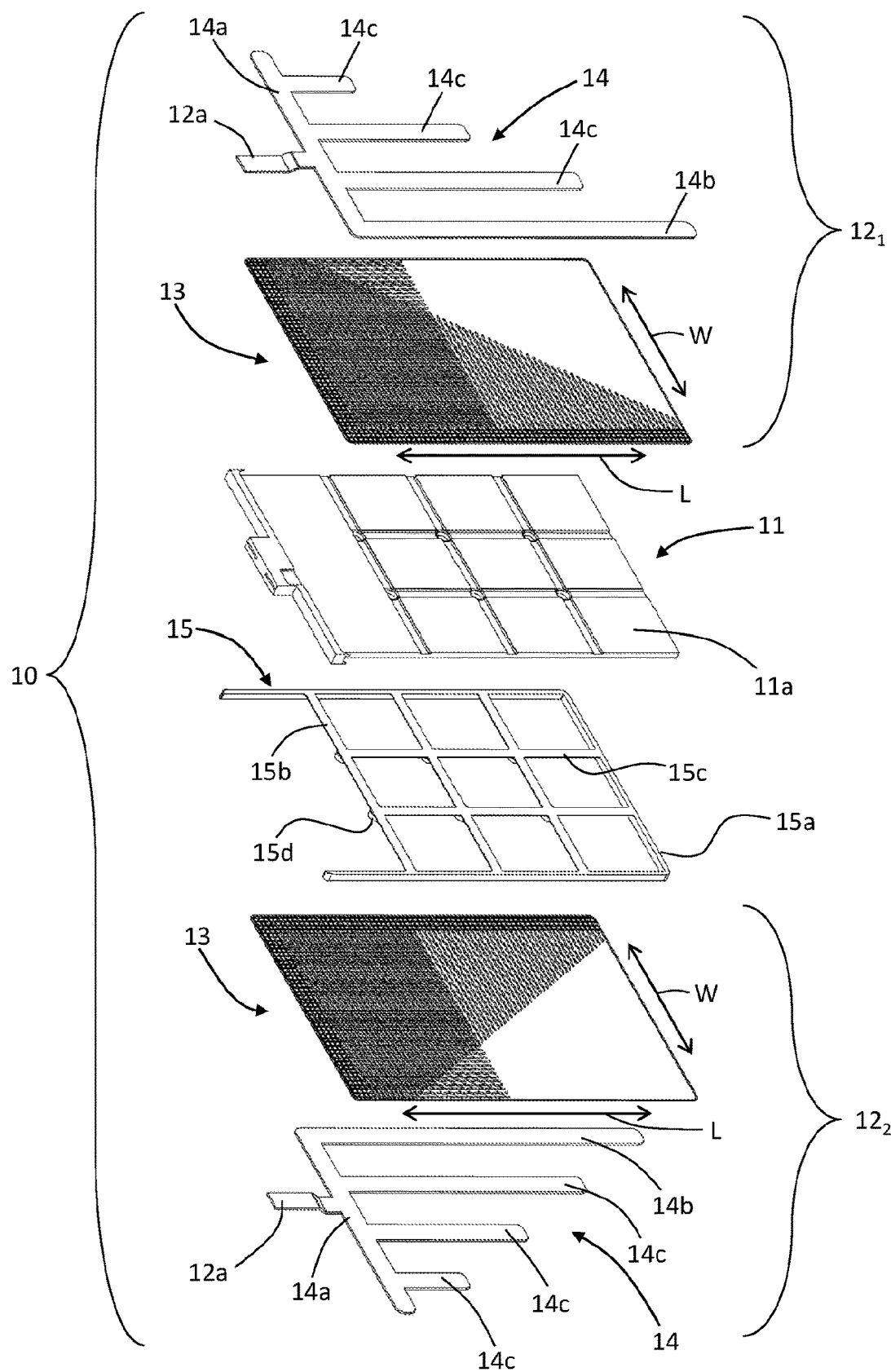
FIG. 3 is an exploded schematic view of a heating element according to possible embodiments of the invention.

Illustrated in exploded view in FIG. 3 is a possible embodiment of a heating element 10. In this figure, designated by 11 is the heating body of the element 10, which is made at least in part of a material having a PTC effect, i.e., a material distinguished by an electrical resistance with positive temperature coefficient, and is arranged so as to be in contact with the two electrodes designated as a whole by $12_1$ and $12_2$.

In preferred embodiments, the material constituting the body 11, designated by 11a, is a polymer-based material (i.e., a material comprising at least one polymer), preferably a composite material having a matrix formed by a polymer or by a mixture of a number of polymers and by a corresponding filler, for example an electrically conductive filler and/or a thermally conductive filler.

In various preferred embodiments, the material 11a of the heating body 11 is a co-continuous polymeric composite with PTC effect, having a matrix that comprises at least two immiscible polymers and at least one electrically conductive filler in the matrix. In preferred embodiments of this type, at least one of the immiscible polymers is high-density polyethylene (HDPE) and at least one other of the immiscible polymers is polyoxymethylene (POM). The electrically conductive filler is preferentially constituted by particles having micrometric or nanometric dimensions, preferably comprised between 10 nm and 20 µm, very preferably between 50 nm and 200 nm, possibly aggregated to form chains or branched aggregates with dimensions of between 1 µm and 20 µm. Preferential materials for the electrically conductive filler are carbon materials, such as carbon black, or graphene, or carbon nanotubes, or mixtures thereof.

HDPE and POM are preferentially in relative percentages of between 45% and 55% of their sum in weight. Preferentially, the electrically conductive filler is confined or mostly confined in the HDPE, in a weight percentage of between 10% and 45%, preferably between 16% and 30% of the sum of the weights of HDPE and the electrically conductive filler. For this purpose, the HDPE and the electrically conductive filler can be mixed together, in particular via extrusion, prior to subsequent mixing with POM, which also in this case can be carried out preferentially via extrusion.

The high melting point of POM makes it possible to keep the two phases, HDPE and POM, better separated, reducing the possibility of migration of the electrically conductive filler into the POM (contributing to this effect is the fact that the filler is preferentially previously mixed with just the HDPE). The higher melting point of POM as compared to other known polymers likewise makes it possible to obtain a more stable final structure: the PTC effect of the composite material limits self-heating to a maximum temperature of approximately 120° C. POM moreover presents a high crystallinity, indicatively between 70% and 80%: this means that, in the preferential co-continuous composite proposed, it is more unlikely for migrations of filler from the HDPE to the POM to occur, thereby preventing the loss of performance of the material with PTC effect, for example due to heating and passage of electric current. The higher crystallinity of POM also renders the composite particularly resistant from the chemical standpoint and bestows high stability thereon. On the other hand, the crystallinity of HDPE is typically comprised between 60% and 90%: in this way, a high concentration of the conductive filler in the amorphous domains is obtained, with corresponding high electrical conductivity.

With reference, for example, to FIG. 3, according to an aspect of the invention, at least one of the electrodes $12_1$ and $12_2$ comprises a meshed structure or a net structure, designated by 13, which is embedded or englobed at least partially in the heating body 11, i.e., in the material 11a that constitutes it.

As will emerge more clearly hereinafter, the at least partial embedding of the meshed structure 13 may be obtained by getting, via mechanical pressure and/or heating, the structure 13 to penetrate into the heating body 11, at a face of the latter, or else by overmoulding at least part of the heating body 11 on the meshed structure 13, or on the corresponding electrode 12.

It should be noted, in this regard, that in FIG. 2 the meshed structure 13 belonging to the electrode $12_1$ is represented, for reasons of greater clarity, practically entirely in view, i.e., as if it were resting on the heating body 11. However, as has been said, in various preferential embodiments of the invention, the aforesaid structure 13 is at least partially embedded in the material 11a of the body 11, preferably in such a way that—between the openings defined between the various meshes of the structure—part of the material 11a is present. On the other hand, it is also possible to embed the meshed structure 13 of an electrode practically completely in the material 11a, as is, for example, represented schematically in FIG. 4.

It is preferable for the meshed structure 13 to extend substantially parallel to a major face of the heating body 11, with the aforesaid structure 13 that defines an area substantially corresponding to that of the major face of the body 11, or in any case an area corresponding to a prevalent part thereof. In this way, the heating body 11 is set between the wide surfaces of the structures 13 of the two electrodes $12_1$ and $12_2$, ensuring a good uniformity and a good intensity of the electrical supply current passing between the electrodes themselves.

The meshed structure 13 hence extends in a length direction L and in a width direction W and is preferably substantially two-dimensional, i.e., of minimal thickness, substantially like a sheet structure.

In various preferred embodiments, the structure 13 is constituted by a fabric formed at least in part with threads of electrically conductive material, preferably metal material. Preferred metals are, for example, selected from among stainless steel, copper, aluminium, brass, bronze, nickel-chrome-based alloys, or iron-chrome-based alloys. The electrically conductive fabric may be obtained via interweaving or criss-crossing of threads using any known technique; for example, the type of weave may be selected from the following:

plain weave, where each weft thread passes alternately above and below each warp thread, and vice versa;
twill weave, where each weft thread crosses two warp threads, alternately;
plain Dutch weave, where the warp threads have a diameter greater than the weft threads, with the weave that is made up of a small number of warp threads interwoven with a large number of weft threads;
Dutch twill weave, which can be obtained via a weave similar to the plain Dutch weave, except that the weave is a twill weave and has a double layer of weft threads;
reverse Dutch weave, which is substantially the reverse of the plain Dutch weave, i.e., with the larger number of finer threads in the warp and the smaller number of coarser threads in the weft; and
reverse Dutch twill weave, which is a weave similar to the previous one, but with each weft thread that crosses two warp threads alternately.

Preferentially, the threads that provide the electrically conductive fabric have a reduced nominal diameter (i.e., prior to weaving), indicatively of between 0.2 mm and 0.02 mm, for the reasons clarified hereinafter. The mesh opening of the fabric, i.e., the space between two adjacent and parallel threads of the structure, is preferably comprised between 1 mm and 0.05 mm.

Figure 5:
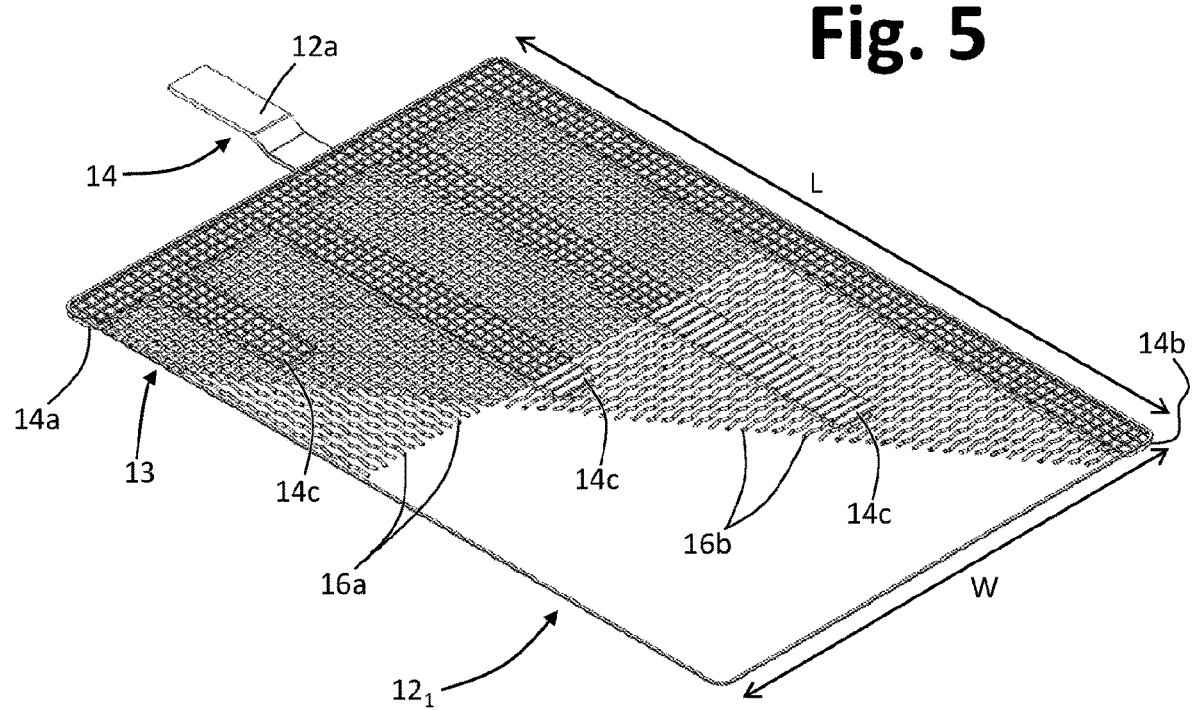
FIG. 5 is a schematic perspective view of an electrode of a heater device according to possible embodiments of the invention.

It should be noted that in FIGS. 3 and 5, the meshed structures 13 are represented in partial and schematic form, in order to highlight—in particular in FIG. 5—the criss-crossing or interweaving of the weft threads and the warp threads, designated by 16a and 16b, respectively.

The fact that the meshed structure 13 is at least partially embedded in the material with PTC effect 11a prevents the risk of the corresponding electrode 12 separating from or peeling off the heating body 11, which is a problem typical of the prior art, even in the presence of possible deformations of the material 11 and/or of the structure 13 due to the heating and cooling cycles. The fact that the meshed structure 13 is in any case relatively dense and extensive in any case ensures a considerable distribution and intensity of the current between the electrodes 12.

As may be appreciated, the peripheral profile of the meshed structure 13 of an electrode 12 may, for example, be easily obtained via elementary operations of cutting or dinking of an electrically conductive sheet or web of fabric or mesh. The aforesaid peripheral profile does not necessarily have to be quadrangular, as exemplified so far in the figures.

According to another aspect of the invention, the at least one electrode $12_1$ or $12_2$ comprises, in addition to the meshed structure 13, also at least one electrical-distribution element, such as the ones designated by 14 in FIGS. 2 and 3, which is fixed to the meshed structure 13 and extends in at least one of the length direction L and the width direction W of the structure 13 itself.

The element 14 is shaped so as to distribute the electric current on the threads 16a, 16b or similar filiform elements that form the meshed structure 13, in particular in order to prevent undesirable concentrations of electric current on a few threads, which could even cause melting of the threads themselves. For this purpose, in various embodiments, the distribution element 14 has at least one portion that extends substantially throughout the whole width W and/or at least one portion that extends substantially throughout the whole length L of the structure 13. However, at least one portion of the distribution element could also extend through only a part of the width W and/or of the length L of the structure 13, preferably for at least one half or one third of the width W and/or of the length L of the structure 13.

The electrical-distribution element 14 is preferentially fixed to the face of the meshed structure 13 opposite to the body 11, in order to not hinder the structure itself from being embedded in the material with PTC effect 11a. The electrical-distribution element 14 could also be fixed to the face of the meshed structure 13 facing the body 11, and in this case also part of the distribution element 14 could be embedded in the structure of the material with PTC effect 11a.

With a view to improving further the distribution of the electric current, in various preferential embodiments at least one portion of the electrical-distribution element 14 extends substantially at or in the proximity of an edge of the meshed structure 13.

Figure 4:
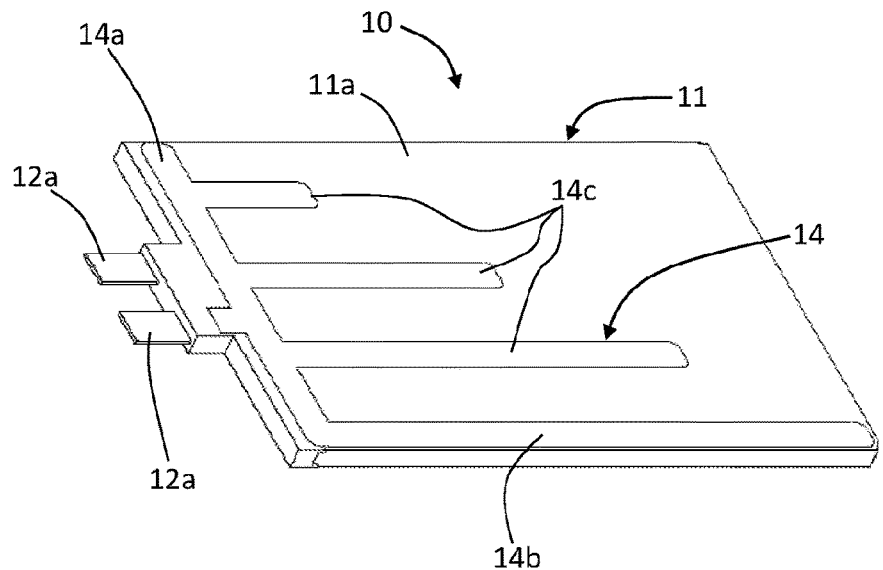
FIG. 4 is a schematic perspective view of a heating element according to possible embodiments of the invention.

With reference, for example, to FIGS. 3-5, it may be noted how the elements 14 represented have at least one portion 14a that extends in a direction transverse to the structure 13 (i.e., in the direction W), as well as at least one portion 14b that extends in the longitudinal direction with respect to the structure 13 (i.e., in the direction L), with these two portions that are preferably substantially at right angles with respect to one another (different angles are, however, possible). In various embodiments, such as the ones represented, branching off from the portion 14a are moreover further portions 14c that extend in the longitudinal direction L, preferably generally parallel to the portion 14b and preferably substantially distributed in the transverse direction W.

The electrical-distribution elements can thus have a substantially comb-like conformation, with teeth or fingers of different length (as in the case of the aforesaid FIGS. 3-5) or else teeth or fingers of the same length. In any case, as it can be seen, the area of overlapping between a distribution element, or of all the distribution portions thereof, and the corresponding meshed structure, is smaller than the area of the latter; in particular, as shown in the figures, the overlapping area is appreciably smaller than the area of the corresponding meshed structure, preferably the overlapping area being at least smaller than one half or one third of the area of the corresponding meshed structure.

In various preferred embodiments, the electrical-distribution element 14 has at least one electrical-connection portion, which, when the device is in the assembled condition, is designed to project beyond a peripheral edge of the meshed structure 13 or of the heating body 11 in order to be accessible for the purposes of electrical connection. In the case exemplified, the aforesaid projecting portion is designated in the figures by 12a, in so far as it corresponds to the terminals referred to previously. Advantageously, then, the electrical-distribution element can define directly an electrical-connection terminal 12a of the corresponding electrode 12.

Also from FIG. 6 it can be inferred how the total area of the distribution portion 14a or of the distributions portions 14a-14b; 14a-14c of an element 14, which is designed to be overlapped to a corresponding meshed structure, amounts to a limited fraction of the area of the meshed structure. As a mere example, by referring to the cases of parts a), b), c) e d) of FIG. 6, the overlapping area may be of less than 10%, less than 20%, less than 30% or less than 50% of the area of the corresponding meshed structure, respectively.

In various embodiments, the distribution element 14 is shaped so as to be connected to a substantial or prevalent part of the threads 16a and/or of the threads 16b that provide the meshed structure 13, preferably with at least one transverse portion (such as the portion 14a) connected to at least one third or at least one half of the threads 16a and/or with at least one longitudinal portion (such as the portion 14b) connected to at least one third or at least one half of the threads 16b.

In various embodiments, the distribution element 14 is shaped so as to be connected to a number of threads 16a and/or threads 16b such that the sum of the sections of these threads is such as to allow the electric current necessary for operation of the device 1 and/or of a heating element 10 to circulate without any damage or anomalies.

Represented merely by way of example in FIG. 6 are some possible configurations of electrical-distribution elements 14 that can be used in heater devices according to the invention. The configurations exemplified do not have an exhaustive nature, since innumerable configurations suited to the purpose are possible.

Illustrated in part A) of FIG. 6 is a simpler shape of the element 14, which has a distribution portion 14a that is to extend in the direction of the width W of a meshed structure 13 (or else, obviously, in the direction of the length L of the aforesaid structure), as well as the portion that constitutes the terminal 12a, here generally orthogonal to the portion 14a.

Illustrated in part B) of FIG. 6 is a prevalently L-shaped element 14, i.e., one that includes both a distribution portion 14a that is to extend in the width direction (or length direction) of a structure 13 and a distribution portion 14b that is to extend in the length direction (or, respectively, width direction) of the same structure 13; also in this case, extending from one of the two aforementioned portions 14a and 14b substantially orthogonal to one another (here the portion 14a) is the connection portion that constitutes the terminal 12a.

Illustrated in part C) of FIG. 6 is an element 14 with a substantially comb-like shape, i.e., including both a distribution portion 14a that is to extend in the direction of width (or length) of a structure 13 and a plurality of distribution portions 14b, 14c, which are substantially parallel to one another and have the same length and are to extend in the direction of length (or, respectively, width) of the same structure 13; in this case, extending from the portion 14a is the connection portion that constitutes the terminal 12a.

Illustrated in part D) of FIG. 6 is an element 14, which has also a substantially comb-like shape, but with series of teeth or fingers that are substantially parallel but of different lengths. In the example, there are provided both a distribution portion 14a that is to extend in the direction of width (or length) of a structure 13 and four pairs of fingers 14b, $14c_1$, $14c_2$, and $14c_3$ that are to extend in the direction of length (or, respectively, width) of the same structure 13, where, for example, the fingers of each pair substantially have the same length but a length different from that of the fingers of the other pairs, and where each finger of one pair is set between two fingers of other two different pairs; also in this case, extending from the portion 14a is the connection portion that constitutes the terminal 12a.

In various preferred embodiments, the electrical-distribution element 14 is formed by a strap or foil of electrically conductive material. Hence, preferentially, also the distribution element 14 is substantially two-dimensional, i.e., it has a very small thickness, preferably of between 0.02 mm and 1.5 mm.

The strap that constitutes the element 14 is preferentially made of a metal material compatible with that of the meshed structure 13, in particular compatible in view of a weld being made between the structure 13 and the element 14; in this perspective, for example, the metal material constituting the aforesaid strap may, for example, be selected from among: stainless steel, copper, aluminium, brass, bronze, nickel-chrome-based alloys or iron-chrome-based alloys.

The strap that constitutes the element 14 may possibly be coated at least in part with a different material, preferably a second electrically conductive material and/or a protective material. In this perspective, the terminal 12a may be coated at least in part with tin, for example to facilitate welding of an electrical thread, or else coated at least in part with gold or some other noble metal, for example to improve the electrical contact with the terminal of an external connector; at least an outer part of the strap not in contact with the meshed structure could also be coated with a protective and/or electrically insulating material.

It will appear evident that also the peripheral profile of the distribution element 14 of an electrode 12 may, for example, be easily obtained via elementary operations of blanking or dinking (and possible deformation) of a sheet or strip of electrically conductive metal.

In preferential embodiments, the mechanical connection or fixing between the meshed structure 13 and a corresponding electrical-distribution element 14 of an electrode 12 is obtained via welding, preferably welding without added weld material.

In various preferential embodiments, the welding operation carried out between the two parts in question is resistance welding, i.e., a method of autogenous pressure welding in which the material is heated via an electrical resistance. Such a technique is exemplified in FIG. 7, where designated by E1 and E2 are two metal electrodes of a welding apparatus.

Figure 7:
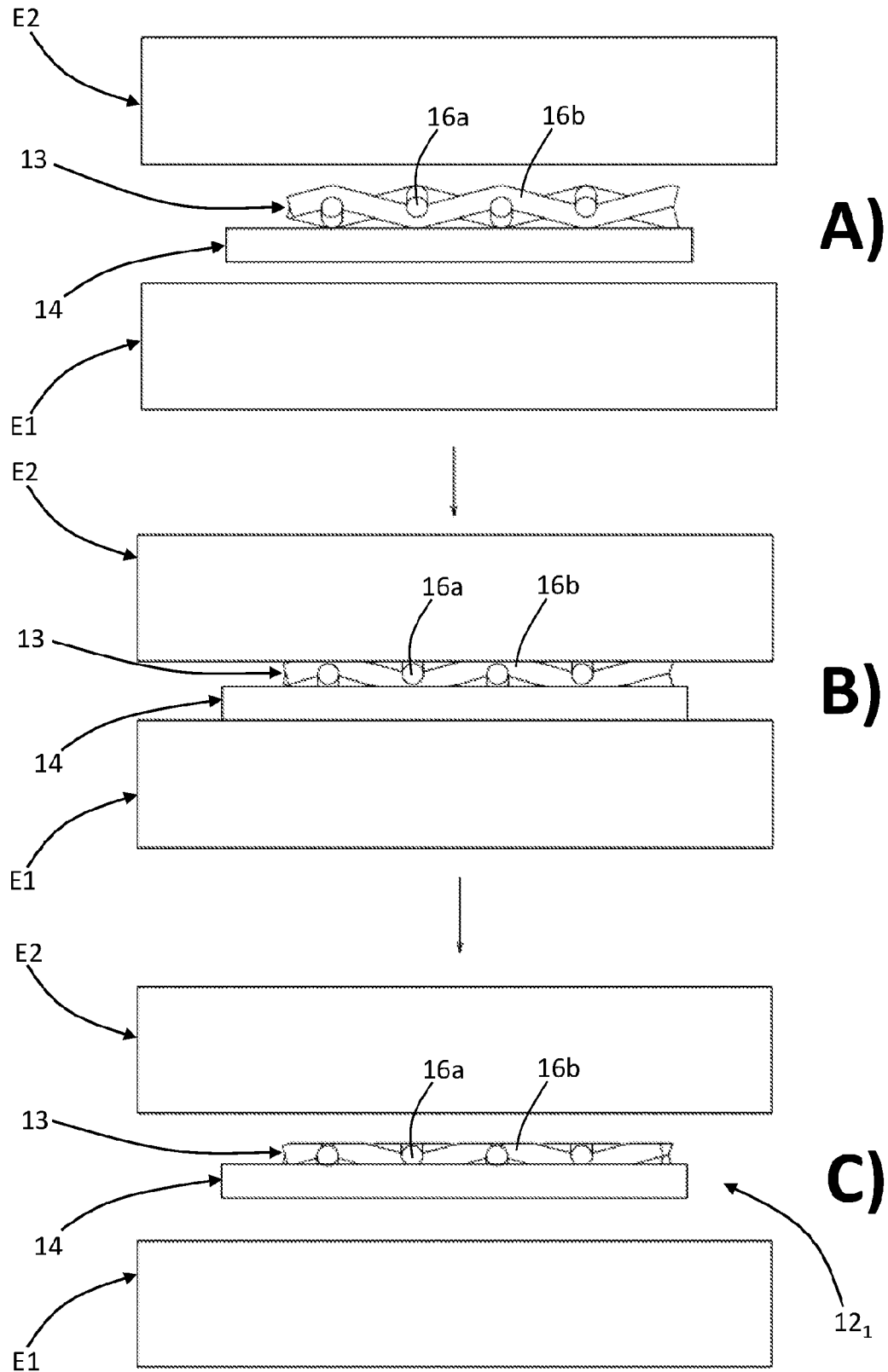
FIG. 7 is a schematic representation of a process for fixing two parts of an electrode of a heater device according to possible embodiments of the invention.

Represented schematically in part A) of FIG. 7 is an initial condition, in which the two welding electrodes E1 and E2 are at a first distance apart, which enables insertion between them of the structure 13 and of the element 14 simply laid on top of one another. Part B) of FIG. 7 exemplifies, instead, a subsequent step in which the two welding electrodes E1 and E2 are brought up to one another so as to press mechanically the structure 13 on the surface of the element 14 in contact with the structure 13 itself, i.e., at the corresponding overlapping areas. Simultaneously with application of the mechanical pressure, between the electrodes E1 and E2 an electric current is made to flow having an intensity such as to generate, by the Joule effect, a heat sufficient to cause partial melting of the threads 16a, 16b and/or of the strap of the element 14 and hence mutual welding (the heat generated at the area of the aforesaid threads and strap will be substantially proportional to the current intensity and to the electrical resistance of the parts to be joined). Part C) of FIG. 7 illustrates the subsequent step in which the welding electrodes E1 and E2 are moved away from one another, to enable removal of the electrode $12_1$, with the structure 13 and the element 14 now welded together.

Welding of the distribution element 14 on the meshed structure 13 typically also causes a deformation of the threads of the aforesaid structure, which is, however, substantially circumscribed to the areas of overlapping between the element 14 and the structure 13. With reference to the welding technique exemplified above, the degree of the deformation of the threads at the overlapping welded areas will be substantially a function of the welding heat generated and/or of the mechanical pressure between the parts. From FIG. 5, and in particular from the corresponding detail of FIG. 8, it may be noted how at the welding areas 17a the shape of the threads of the meshed structure 13 differs from that of the non-overlapping areas 17b not involved in the welding process. This circumstance may be better appreciated from the further detail represented in FIG. 9, where there may be noted the different shape of the threads 16a, 16b at the welding areas 17a, where the aforesaid threads are squeezed, with partial melting, and in the areas 17b not involved in the welding process, where the threads substantially maintain the initial nominal diameter and/or shape.

FIG. 10 exemplifies, via a view similar to that of FIG. 9, the case of a more intense welding carried out between the structure 13 and the element 14, i.e., with a greater generation of heat and/or a higher mechanical pressure at the areas to be welded 17a, and hence with a consequent more marked melting and/or deformation of the threads 16a, 16b, which in these areas 17a come to form a substantially flat grid.

In various embodiments, such as the ones so far exemplified, both of the electrodes $12_1$ and $12_2$ each comprise at least one corresponding meshed structure 13 and at least one corresponding electrical-distribution element 14, the two electrodes being preferably substantially the same as one another, to the advantage of standardisation of production. The electrodes $12_1$ and $12_2$ may be integrated in the heating body 11 at opposite faces of the body 11, preferably opposite major faces that are substantially parallel to one another, in order to bring about a circulation of the electric current in a plane perpendicular to the aforesaid faces, i.e., through the thickness of the body 11. According to other embodiments, however, the electrodes may be located at one and the same face of the body 11. Moreover, as has been said, it is preferable for the electrodes $12_1$ and $12_2$, or at least the respective meshed structures 13 to extend substantially parallel to a corresponding face of the body 11.

Arrangements of the above type are particularly advantageous when the distribution elements 14 of the two electrodes $12_1$ and $12_2$ have respective electrical-connection portions 12a, which can hence be set in a position close to one another to provide an electrical connector, such as the connector 3.

Hence, in various embodiments, at least part of the heating body 11 is set between the two electrodes $12_1$ and $12_2$, preferably a part having a substantially constant thickness. The body 11 can have perimetral dimensions substantially similar to those of the electrodes, or of their structures 13, but not excluded is the case of a part of the body 11 that projects beyond the edges of the structures 13, or else that is recessed with respect thereto.

To return to FIGS. 2-3, in the case exemplified the heating body 11 is preferably a body overmoulded at least in part on the electrodes $12_1$ and $12_2$. In applications of this type, the two electrodes in question are inserted in a mould, into which the polymeric material with PTC effect 11a is injected in the molten state. In order to facilitate the aforesaid production step, in particular during injection of the polymer and/or during previous handling of the semi-finished product, between the two electrodes there can be interposed a spacer body and/or positioning body, in particular configured for ensuring proper relative positioning of the electrodes, in particular in the mould.

Exemplified in FIG. 3 is a possible embodiment of a such a spacer body, designated by 15, which may be made of an electrically insulating material, or else may itself be made of a material having an electric resistance or a PTC effect, which, for example, is also a polymer-based material. In the example, the spacer body 15 is shaped basically to define a meshed framework, with a sort of peripheral frame 15a extending within which are a series of longitudinal elements 15b and a series of transverse elements 15c, preferably coplanar with respect to one another. In the case where the elements 15b and 15c have a height (thickness) smaller than that of the frame 15a, it is possible to provide reliefs 15d at the areas of criss-crossing between the aforesaid elements 15b and 15c in order to compensate for the difference in height. Some reliefs 15d could also be shaped as engagement means so as to engage with at least one electrode $12_1$ and/or $12_2$, for example in openings of the structure 13.

In the example, the outer side of the peripheral frame 15a of the spacer body 15 is designed not to be coated by the material 11a of the heating body 11 so as to constitute a peripheral edge of at least one part of the heating element 10 (see in this connection FIG. 2). It will be appreciated in any case that also a spacer body could be completely embedded in the overmoulded material 11a, as, for example, in the case of FIG. 4, where also the meshed structures of the electrodes are completely embedded in the material 11a of the heating body 11. It will moreover be appreciated that the shape of the spacer body used may be different from the one exemplified, provided that its functions remain the same.

A heater device according to the invention may comprise a plurality of heating elements and/or, as already mentioned, may be integrated in a component that performs also functions different from, or additional to, heating of a generic medium.

Illustrated in FIGS. 11-25 are various embodiments that are suited to implementing both of the aforesaid characteristics. These figures exemplify how, in various embodiments, the heater device, or a heating element thereof, can have a generally arched shape, unlike the embodiments illustrated previously, where the device 1 and the heating element 10 are generally straight or planar. Even just a single part of a heating element (the heating body or an electrode thereof) may be at least in part planar, or else at least in part arched, or else be in part planar and in part arched.

Figure 11:
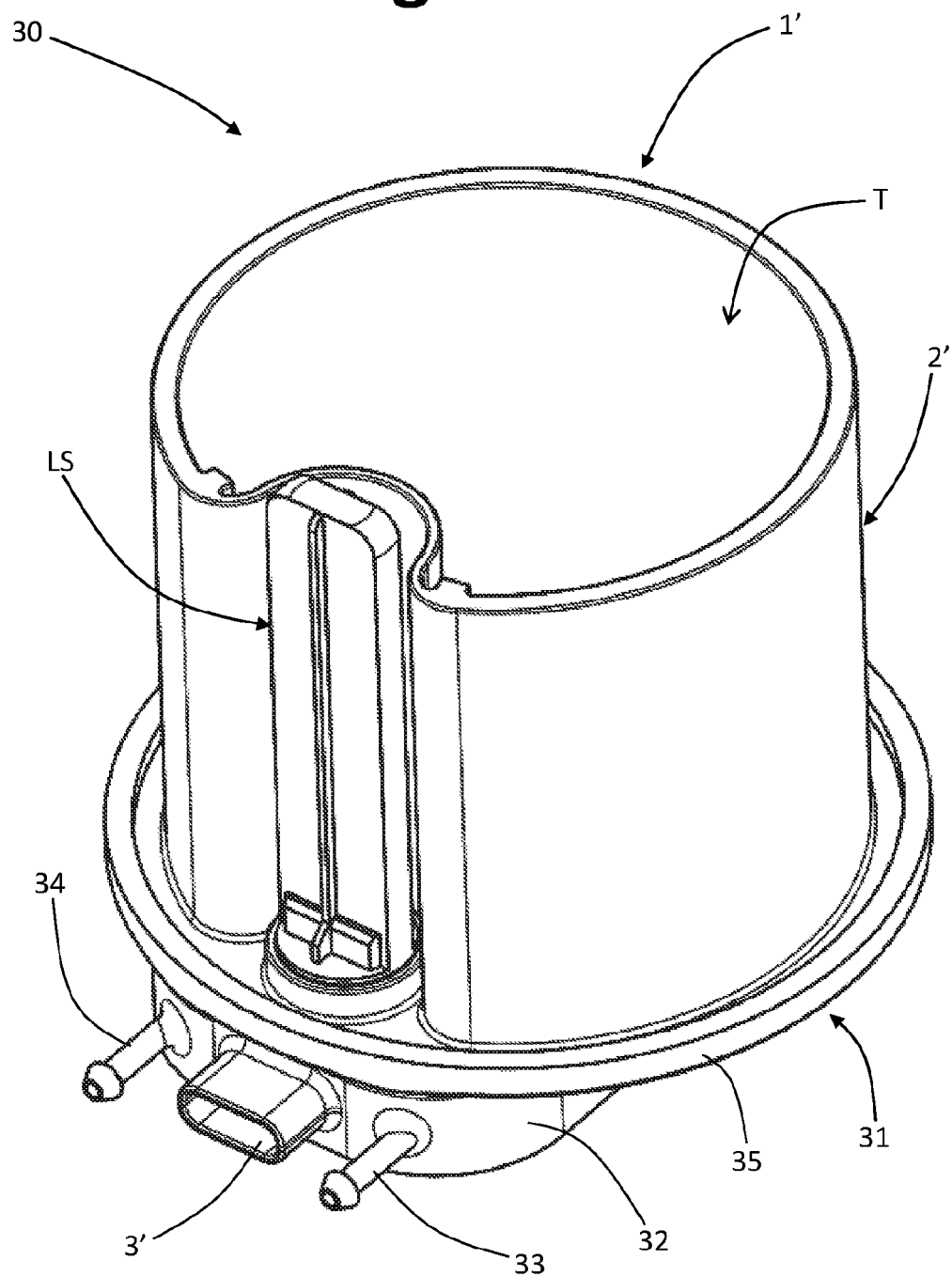
FIG. 11 is a schematic perspective view of a motor-vehicle component that integrates a heater device according to possible embodiments of the invention.

With reference in particular to FIG. 11, designated as a whole by 30 is a motor-vehicle component, and in particular a component of a tank for containing a generic liquid substance. The component 30 may, for example, form part of a system of the type known as Water-Injection or Anti-Detonant Injection (ADI), in which case the liquid in question is water that is to be injected into a cylinder of an internal-combustion engine. Alternatively, the component 30 could form part of a so-called Selective-Catalytic-Reduction (SCR) system, in which case the liquid in question is an aqueous solution containing urea that is to be injected into the exhaust line in order to reduce nitrogen oxides.

As mentioned in the introductory part of the present description, on the other hand, the component 30 could be of some other type, for example a component for housing or installing a fuel filter of an internal-combustion engine.

In the case exemplified, the component has a substantially cup-shaped body, in which there may be identified a generally tubular upper part, designated by 1', in so far as it is basically provided by a heater device according to the invention, and a lower base 31, having a lower box-shaped portion 32 provided with an inlet 33 and an outlet 34 for the liquid, and preferably provided with an electrical connector 3'. The upper part 1' could, however, also have some other shape, possibly provided with openings, for example made up of a number of arched walls set at a distance from one another in order to provide at least one intermediate opening.

The box-shaped portion 32 is preferentially provided with a lower lid (not shown) to enable positioning inside it of functional elements, such as electrical circuit parts. In the example, the body of the base 31 also has a flange portion, designated by 35, which could also serve for fixing the component 30 to some other part of a vehicle, such as for fixing or welding of the component 30 to a tank.

The component 30 illustrated likewise integrates a further functional component, for example a sensor, such as a level sensor, denoted as a whole by LS, which constitutes in any case an optional element of the component 30; for this purpose, the device 1' and/or the base 31 can be appropriately shaped and/or provided with at least one opening or seat for housing the aforementioned further functional component.

As may be appreciated, following upon joining in a sealed way of the device 1' to the base 31, the body as a whole of the component 30 is formed, which defines a volume—denoted by T in FIG. 11—designed to contain the liquid, or in any case designed to define an internal area in which the liquid can be heated more easily.

Figure 12:
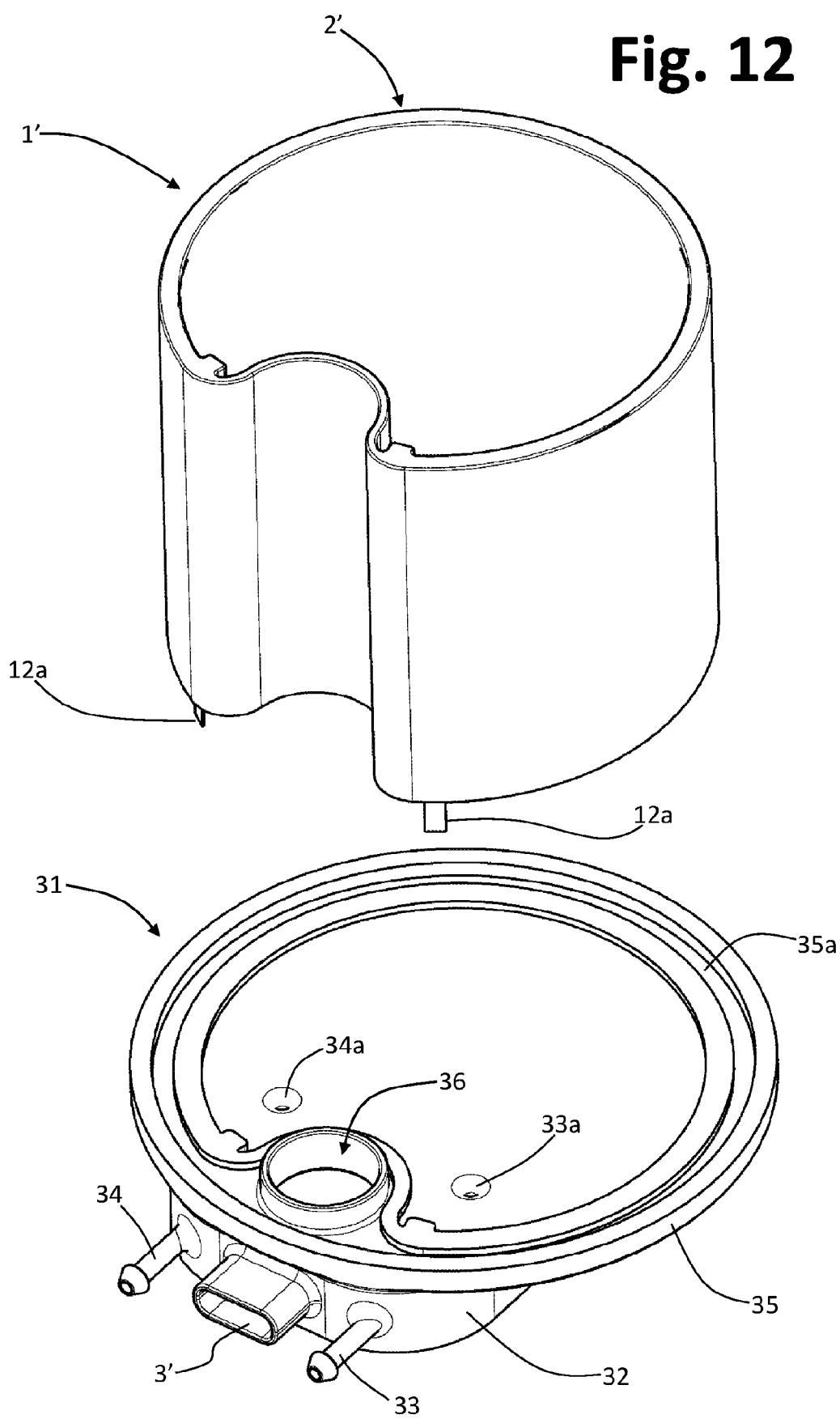
FIG. 12 is a partially exploded schematic view of two parts of the component of FIG. 11.

FIG. 12 is a partially exploded view of a component 30, of the type in which the heater device 1' and the base 31 are configured as parts distinct from one another and fixed together in a sealed way. As may be noted, the heater device 1' has a casing body of its own, designated by 2', having a substantially tubular shape, which may, for example, be made of an electrically insulating material (for example, a polymeric material) overmoulded on a plurality of heating elements, as clarified hereinafter. As may be noted, projecting from the casing body 2', here at a lower edge thereof, are terminals 12a for electrical connection of the heater device, which are to be electrically connected to an electrical circuit present in the base 31, which includes respective terminals (not shown) of the connector 3'. In the figures just two terminals 12a are shown, but the device 1 may comprise more than two, as exemplified hereinafter.

Once again from FIG. 12 it may be noted how, in the example, at the upper face of the base 31 an inlet port 33a and an outlet port 34a for the liquid are defined, which are in fluid communication with the inlet 33 and the outlet 34, respectively. Illustrated moreover in FIG. 12 is a seat 36 for positioning and electrical connection of the further functional component, such as the level sensor LS of FIG. 11, and it may likewise be noted how, within the flange portion 35 of the base 31 a substantially annular seat 35a is defined, for fixing in a sealed way the lower edge of the casing body 2' of the heater device 1'. The body of the base 31 may be obtained at least in part via moulding of polymeric material, for example the same material used for producing the casing body 2'.

Figure 13:
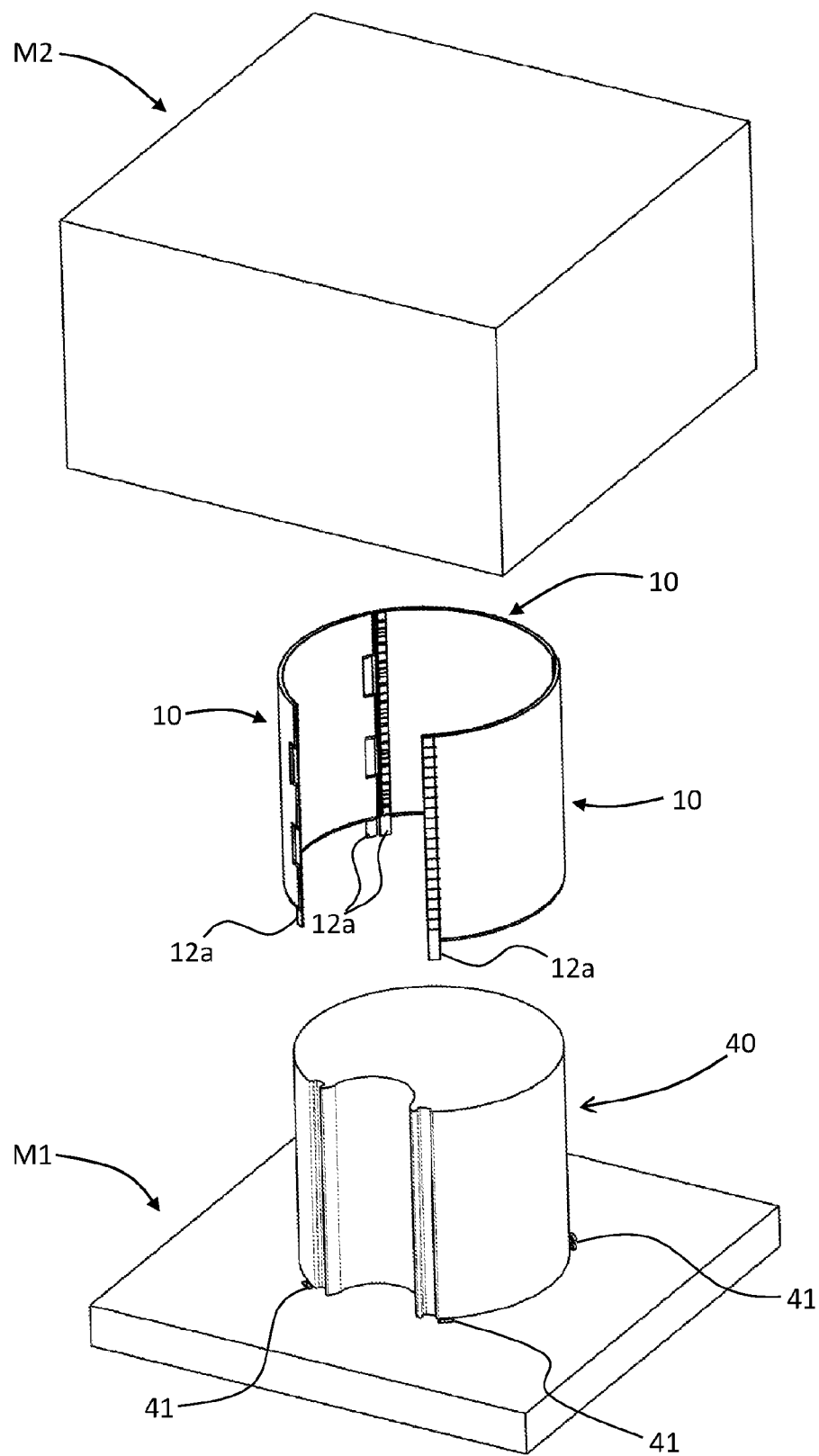
FIG. 13 is a schematic representation of a first process for obtaining a casing body of a heater device according to possible embodiments of the invention.

FIG. 13 exemplifies a possible step of overmoulding of the casing body 2' of the heater device 1' of FIGS. 11-12. In the example, the heater device is designed to integrate three heating elements 10 having a generally arched shape, which are preferably, but not necessarily, substantially the same as one another. In the example, the mould part designated by M1 has a base part (without any reference number), rising from which is a shape 40 designed to define the inner peripheral surface of the casing body 2' of the heater device. In the aforesaid base part, in a peripheral position with respect to the shape 40, seats 41 are defined, into which there may be inserted the terminals 12a of the heating elements 10, which are positioned on the mould part in the proximity of one another to form an arc of a circle. The mould part M2 defines a hollow impression (not visible), designed to define the outer peripheral surface of the casing body 2' of FIGS. 11-12, as well as its top edge.

As may be appreciated, after positioning of the heating elements 10 on the mould part M1, as in FIG. 13, the two mould parts are closed on one another so as to delimit a hollow shaped volume having a shape corresponding (complementary) to that of the casing body 2', and injected into the aforesaid hollow volume is the polymeric material designed to form the aforesaid casing body. After the time necessary for solidification and cooling, the mould parts M1 and M2 can be opened again, and the device 1' including the casing body 2' can be extracted, as represented in FIG. 12.

As an alternative to what has been exemplified with reference to FIGS. 12 and 13, at least part of the base 31 and of the casing 2' of the heater device 1' may also be configured in a single piece, in particular a piece obtained by overmoulding the necessary polymeric material on the heating elements 10. Such a case is exemplified schematically in FIGS. 14 and 15, where designated by M3 and M4 are two corresponding mould parts. In this case, the mould part M3 has an impression 43 designed to define part of the outer profile of the base 31 and its inner profile (as has been mentioned, the base 31 can have a lower opening that is to be closed by a lid applied subsequently). Defined within the impression 43 are seats 41 for the terminals 12a of the heating elements 10, as described with reference to FIG. 13.

The mould part M4 instead defines an impression 42, visible only partially, designed to define the remaining part of the outer profile of the base 31, as well as the casing body 2' of the heater device 1' (within the aforesaid impression there will then be provided also a shape of a type similar to the one designated by 40 in FIG. 13).

Hence, also in this case, after positioning of the heating elements 10 on the mould part M3, as in FIG. 14, the two mould parts M3 and M4 are closed on one another so as to delimit a hollow shaped volume, injected into which is the polymeric material that is to form the body defining both the base 31 and the casing body 2'. Also in this case, after the time required for solidification and cooling, the mould parts M3 and M4 can be re-opened and the corresponding semi-finished product of the component 30 can be extracted, as represented in FIG. 15.

Figure 16:
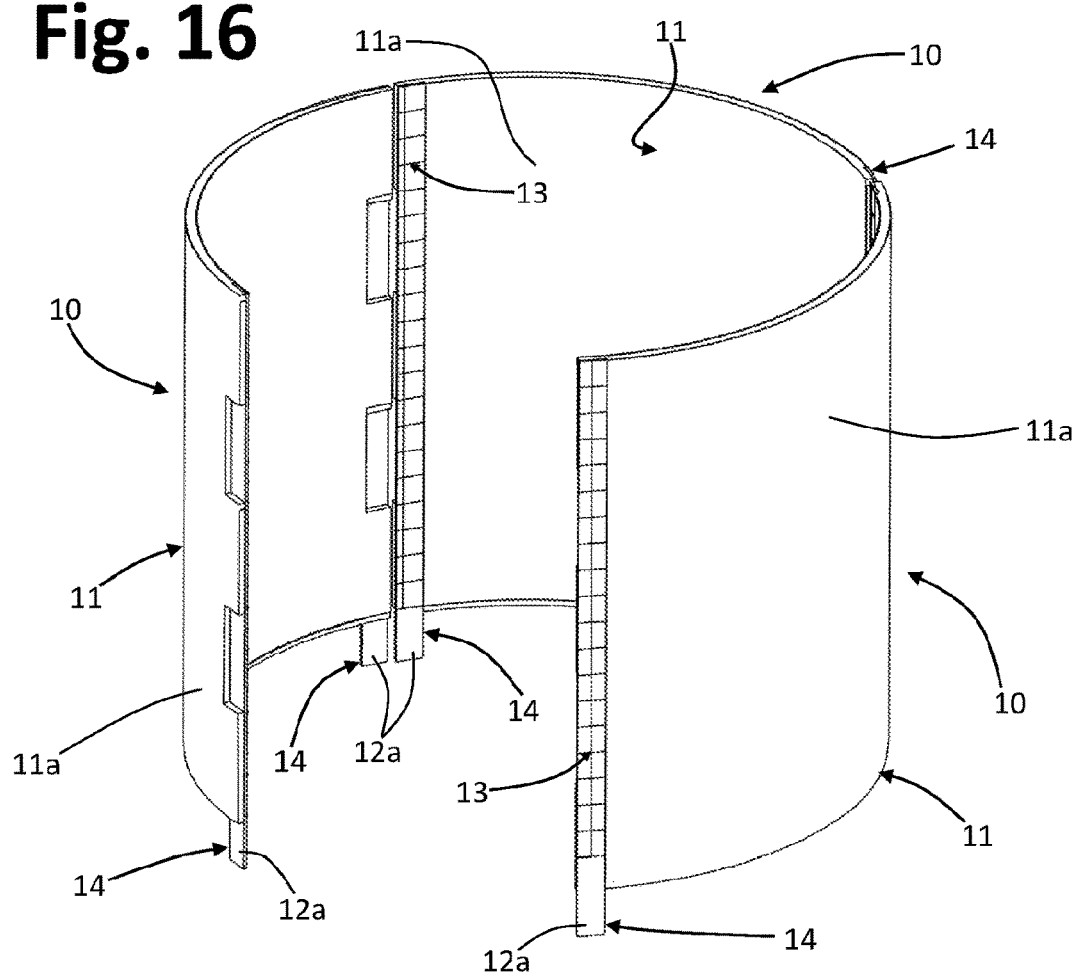
FIG. 16 is a schematic perspective view of a plurality of heating elements of a heater device according to possible embodiments of the invention.

Represented schematically in FIG. 16 are three heating elements 10 having an arched configuration, for example of a type suitable for production of the heater device 1'. In the example, each element 10 includes the respective two electrodes, each formed by at least one meshed structure 13 and at least one electrical-distribution element 14, shaped for defining a respective terminal 12a, here projecting downwards. Visible in FIG. 16 is just one part of the structure 13, i.e., the part welded to the element 14, the remaining part of the structure being or embedded in the material with PTC effect 11a of the heating body 11. The electrodes are preferably arranged so that the respective distribution elements 14 are located substantially at opposite longitudinal edges of the corresponding heating element 10; this does not constitute in any case an essential characteristic.

Figure 17:
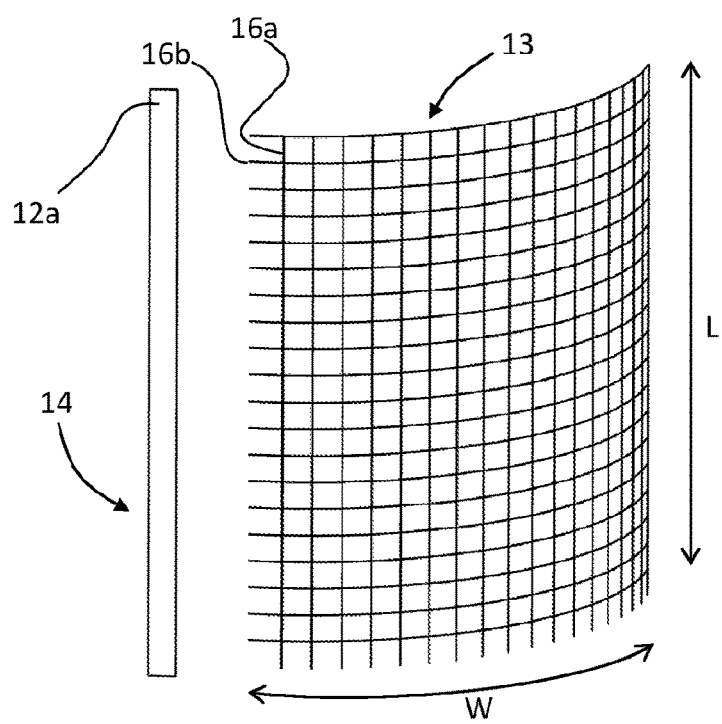
FIG. 17 is an exploded schematic view of an electrode of a heater device according to possible embodiments of the invention.

A meshed structure 13 and a corresponding electrical-distribution element 14 are illustrated schematically in FIG. 17. As may be noted, the structure 13 has an arched shape and the element 14 consists of a single portion, which here extends in the length direction L of the structure 13 in order to be fixed at or in the proximity of a longitudinal edge thereof. The length of the element 14 is greater than that of the structure 13, so that a terminal portion of the element 14 provides the corresponding terminal 12a. The join between the two parts 13 and 14 may be of a welded type, for example as described previously with reference to FIG. 7. It should be noted that in FIG. 17, as in the subsequent figures, the meshed structure 13 is represented only schematically, with very wide mesh openings, to enable a more immediate understanding.

As mentioned previously, at least part of the meshed structure 13 may be force-fitted in the heating body 11 at a face of the latter, i.e., by getting the structure 13 to penetrate into the body 11.

Figure 18:
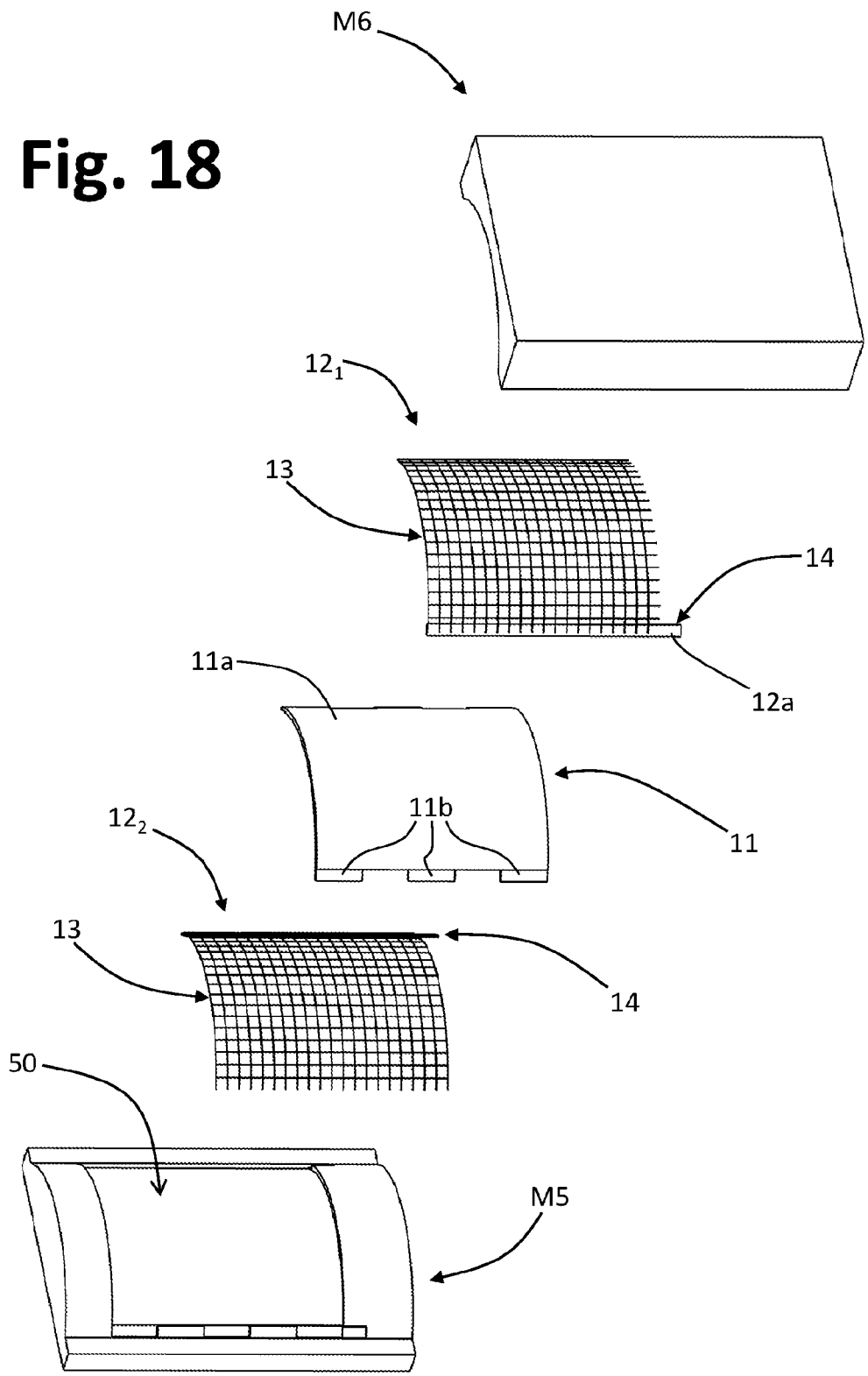
FIGS. 18 and 19 are schematic representations of a first process for obtaining a heating element according to possible embodiments of the invention.

A possible technique, in this connection, is exemplified in FIG. 18, where designated by M5 and M6 are two moving elements, at least one of which is movable with respect to the other, of a pressing apparatus. Each moving element can define a respective seat 50 (here only the seat of the moving element M5 is visible) designed to receive a corresponding part of an arched electrode $12_1$ or $12_2$, respectively, and a corresponding part of a pre-formed heating body 11. The body 11 may be in this case obtained via operations of blanking or dinking starting from a sheet or web of the PTC-effect polymer, which is then heat-formed in order to bestow thereon the necessary arched configuration, or else the body 11 may be directly injection-moulded in the arched form.

The electrodes are set between the moving elements M5 and M6, exploiting the corresponding seats 50, and then the moving elements themselves are forced on one another, so that the meshed structures are forcefully pressed or pushed against the opposite major faces of the body 11, causing the structures to penetrate into the faces. For this purpose, in preferential embodiments, at least one of the moving elements M5 and/or M6, or the corresponding pressing apparatus, is configured for heating the body 11 in order to cause a modest softening thereof, that facilitates penetration of the structures into the material 11a. Then, in particular after cooling of the body 11 if heating thereof is envisaged, the two moving elements M5 and M6 are moved away from each other, and the heating element 10 thus obtained can be extracted from the apparatus, as exemplified in FIG. 19. The heating element 10 may be in the form represented in FIG. 20, with the threads of the structures 13 completely embedded in the material 11a (possibly except for those welded to the respective distribution elements 14), or else the threads may be partially exposed, if they are not completely embedded in the material 11a.

In applications of this type, the body 11 is preferentially pre-formed so as to present, at an edge, at least one area of smaller thickness (11b, FIG. 18) for positioning of the element 14, so that the outer surface of the latter will substantially be flush with the surface of the face of the body 11 in which the threads of the structure 13 are embedded.

The seats 50 of the moving elements M5 and M6 will preferentially include a portion designed to receive the portion 12a of the element 14 projecting from the structure 13.

Figure 19:
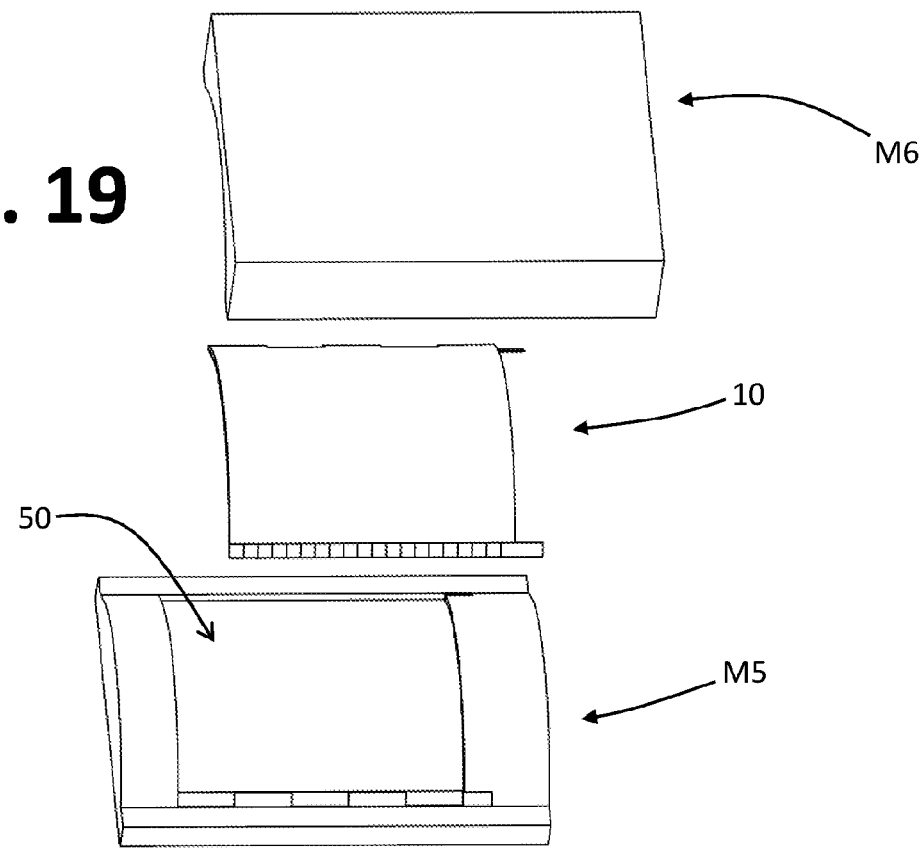

Of course, the apparatus described with reference to FIGS. 18 and 19 may have a shape different from the one exemplified, provided that its functions remain the same. For instance, just one of the two moving elements M5 and M6 could include a seat 50 designed to receive both of the electrodes $12_1$ and $12_2$ with the pre-formed body 11 set in between, with the other moving element that includes a part in relief designed to exert the mechanical pressure where necessary, when the two moving elements are pressed against one another.

Figure 20:
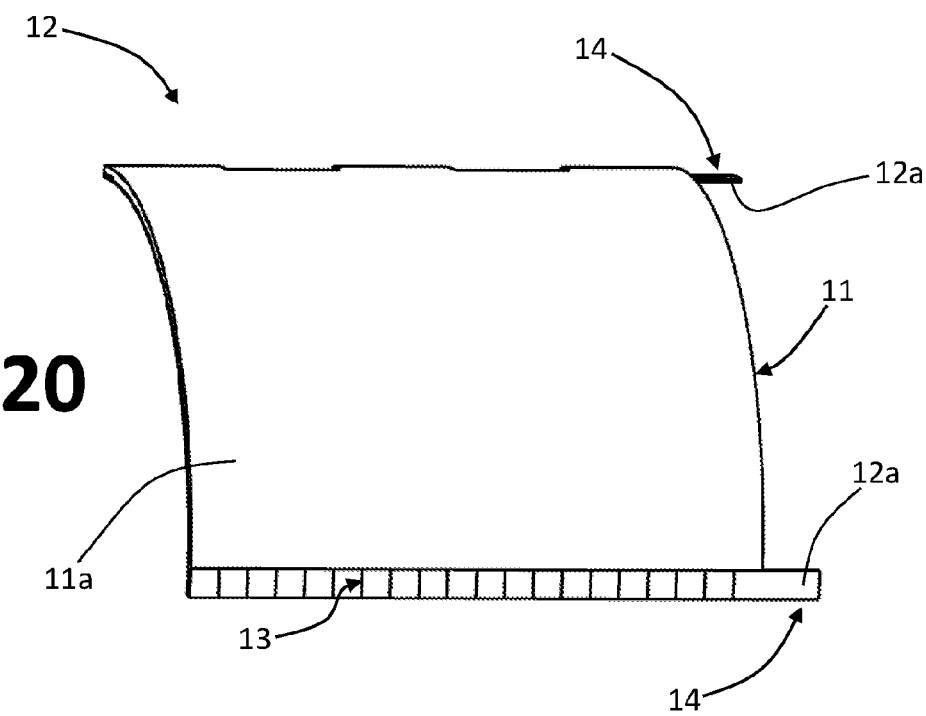
FIG. 20 is a schematic perspective view of a heating element that can be obtained with the process of FIGS. 18-19.

It will be appreciated that what has been described with reference to FIGS. 18-20 may be applied also to the case of straight or plane heating elements, for example as in FIG. 4, of course with a different shape of the moving elements M5 and M6 and of the corresponding impressions 50.

Of course, also in the case of heating elements that are at least in part arched, the polymeric material with PTC effect 11a can be overmoulded at least in part on the electrodes $12_1$ and $12_2$, for example as described previously with reference to the heating elements of FIGS. 2-3. Such a case is represented schematically in FIG. 21, where designated by M7 and M8 are two mould parts for injection of the material 11a that is to form the heating body 11, where each mould part includes a respective impression that is to define a corresponding part of the profile of an arched heating element 10.

Figure 21:
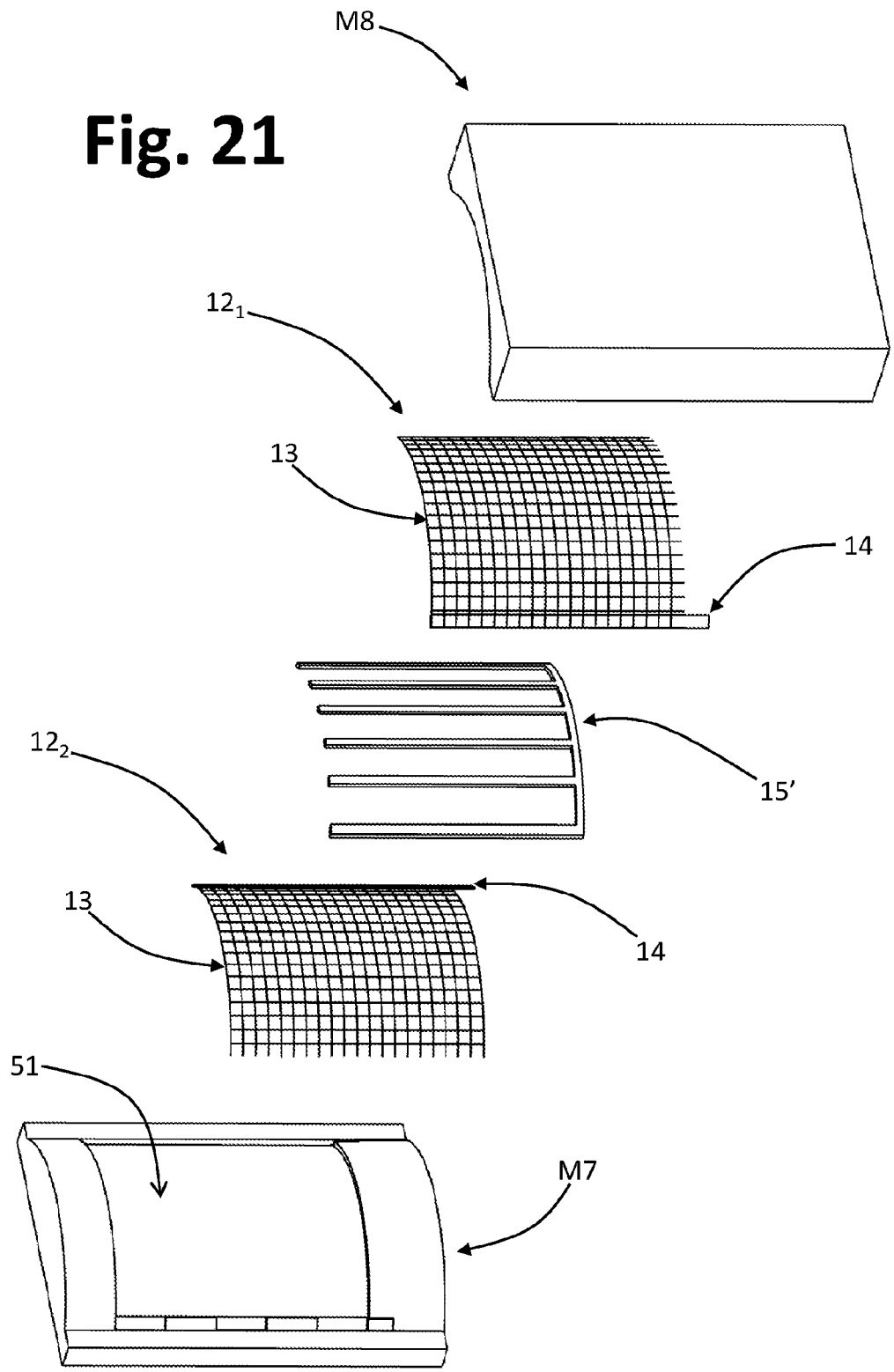
FIG. 21 is a schematic representation of a second process for obtaining a heating element according to possible embodiments of the invention.

Also in this case, as described previously, it is preferable to provide a spacer and/or positioning body (here designated by 15') that is to be interposed between the electrodes $12_1$ and $12_2$ when these are inserted into the mould, for example in the impression 51 of the mould part M7 visible in FIG. 21. In the case illustrated in FIG. 21, the body 15', which may be made of electrically insulating material or else of a resistive material with PTC effect, has a substantially comb-like shape, arched according to the shape of the electrodes $12_1$ and $12_2$, but obviously this shape is to be understood as being provided merely by way of example.

Figure 22:
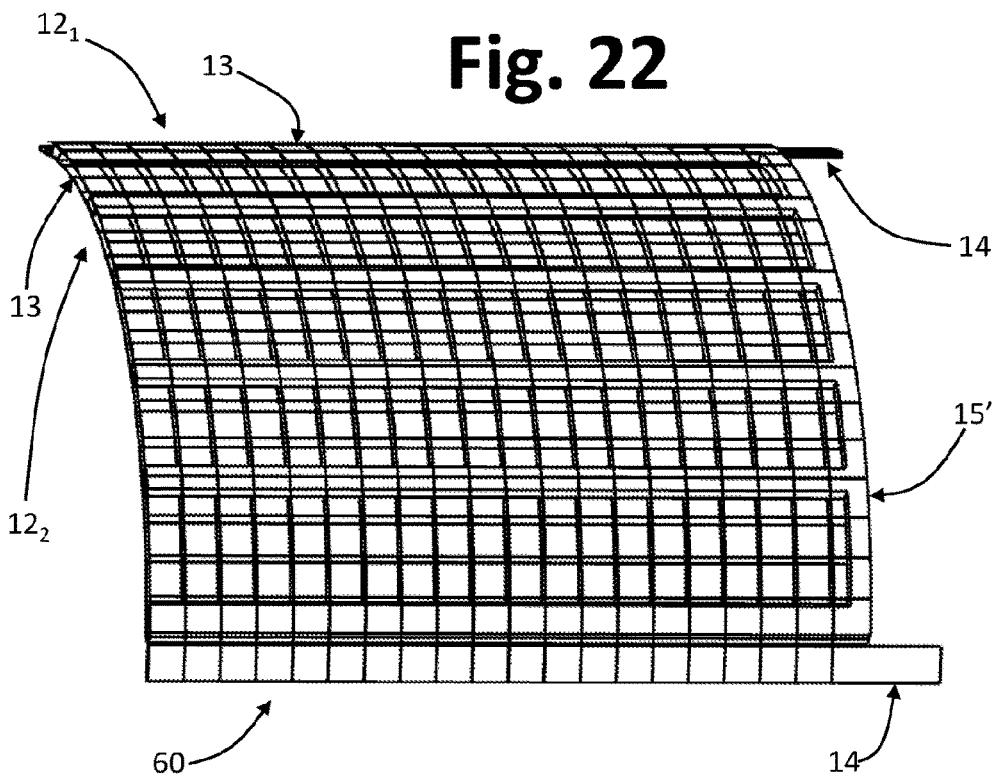
FIG. 22 is a schematic perspective view of a semi-finished product used in the process of FIG. 21.
Figure 23:
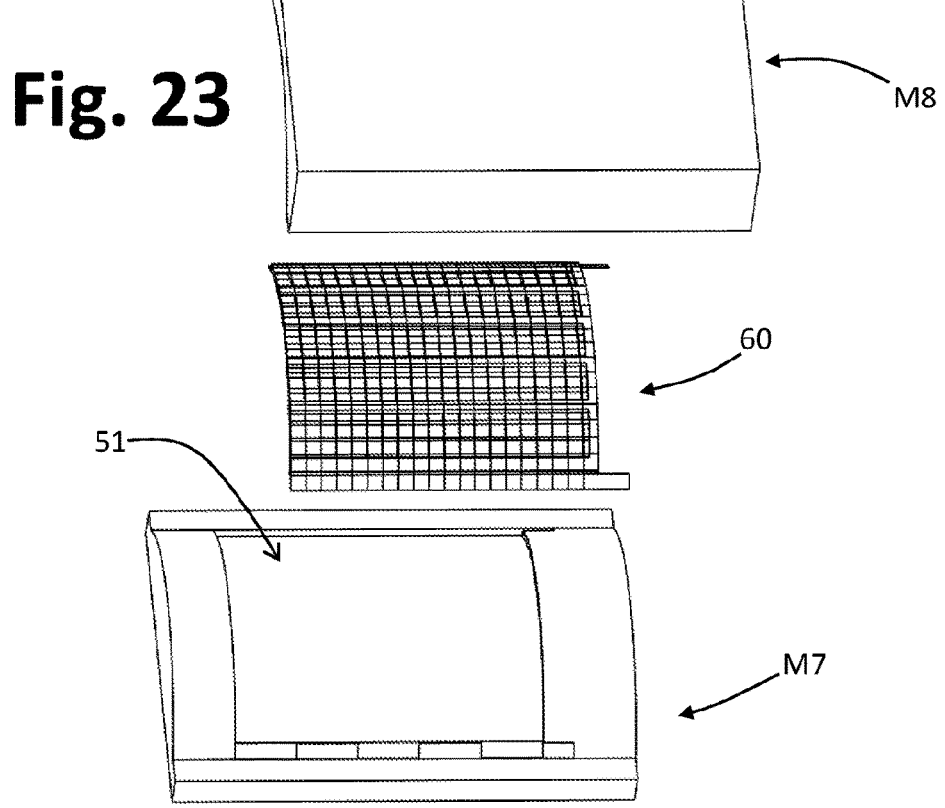
FIGS. 23 and 24 are further schematic representations of the process of FIG. 21.
Figure 24:
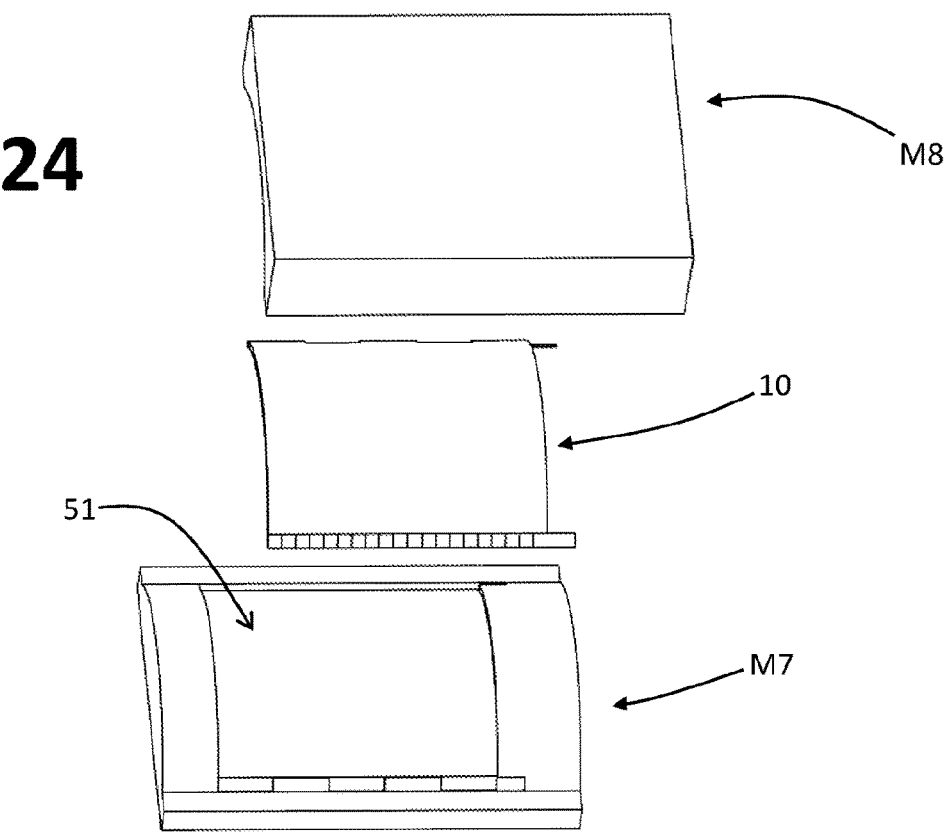

FIG. 22 shows schematically the result of the operation of setting the electrodes $12_1$ and $12_2$ on top of one another, with the spacer body 15' that keeps them at the right distance apart and the fingers of the body 15' that here extend in the longitudinal direction of the electrodes themselves, i.e., substantially parallel to the electrical-distribution elements 14. FIG. 23 illustrates, instead, the step of insertion of the ensemble or "sandwich" formed by the electrodes $12_1$ and $12_2$ and the spacer body 15' between the parts M7-M8, after closing of which the polymeric material 11a that is to form the heating body 11 is injected into the mould. FIG. 24 exemplifies the subsequent step of re-opening of the mould and extraction of the heating element, after the time necessary for solidification and cooling of the injected material. Also in this case, the element 10 may present with the threads of the structures 13 completely embedded in the material 11a (possibly except for the ones welded to the respective distribution elements 14), or else the aforesaid threads may be partially exposed if the moulding operation does not envisage complete covering thereof by the material 11a.

Figure 25:
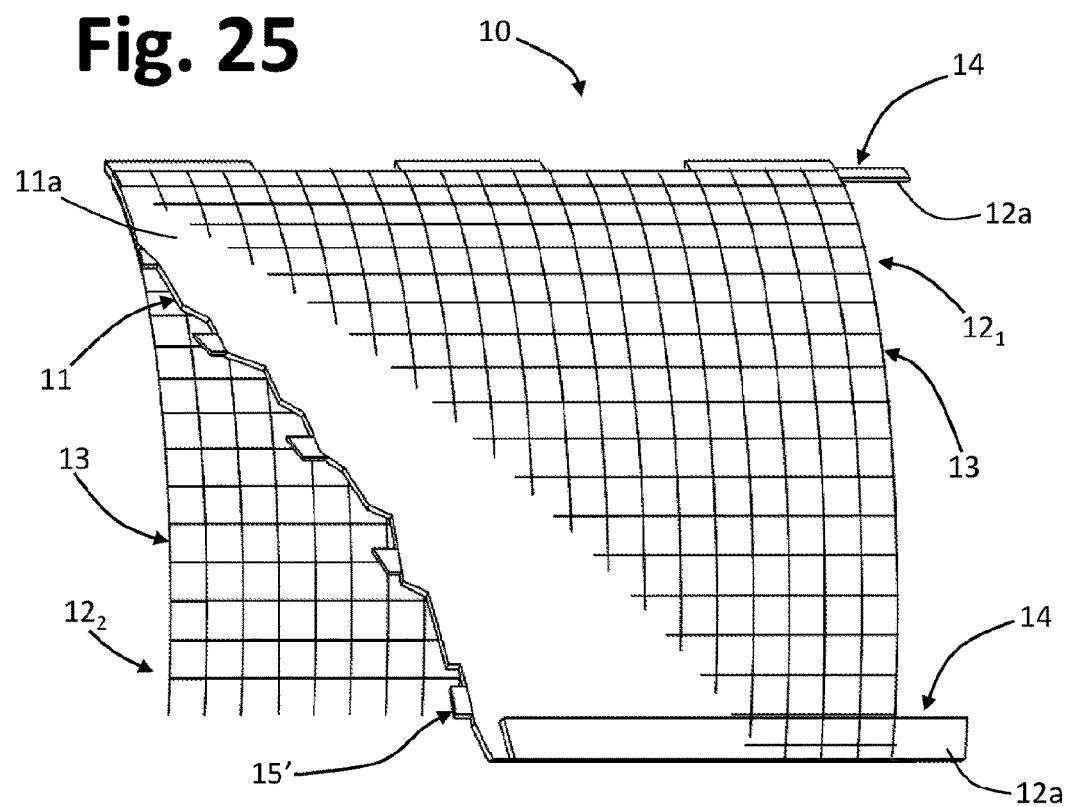
FIG. 25 is a partially sectioned schematic representation of a heating element according to possible embodiments of the invention.

FIG. 25 is a partially sectioned schematic view of a heating element obtained according to FIGS. 21-24, from which it may be noted how also the spacer body 15' is embedded in the material 11a in the space between the two electrodes $12_1$ and $12_2$.

Figure 26:
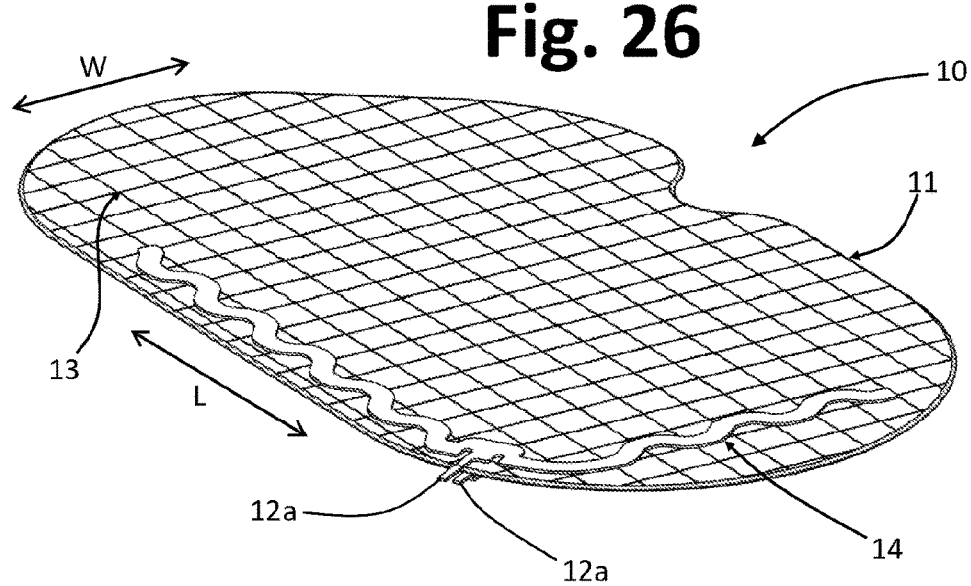
FIGS. 26 and 27 are a schematic perspective view and an exploded schematic view, respectively, of a further heating element according to possible embodiments of the invention.
Figure 27:
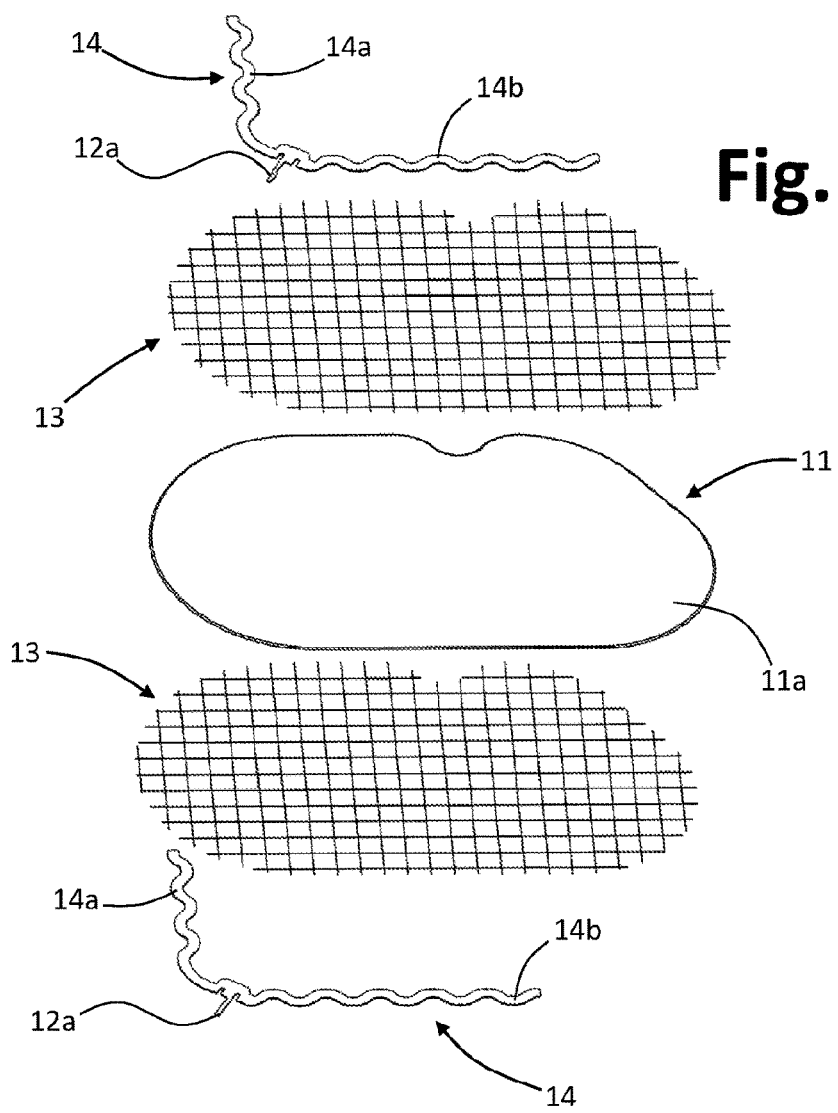

FIGS. 26 and 27 are schematic illustrations of a further possible embodiment of a heating element of a heater device according to the invention. These figures show how the element 10 does not necessarily have to be substantially quadrangular or polygonal, it possibly having a peripheral profile partially curved and/or comprising stretches that are curved and stretches that are rectilinear.

FIGS. 26 and 27 likewise show how, in various embodiments, an electrical-distribution element 14 may present a dimensional-compensation structure, to compensate for the possible dimensional variations, for example with intermediate curves, or else have a substantially wavy development, or distinguished by a sequence of curves and/or stretches that are angled or oriented in opposite directions.

Shapes of this type may prove convenient to enable the distribution element 14 to lengthen and/or shorten in order to compensate for possible dimensional variations due to thermal variations, such as expansions and contractions and/or lengthening and shortening in at least one of the directions L and/or W, in particular during heating of the heating body 11 made of PTC material 11a.

Preferably, the aforementioned dimensional-compensation structure enables compensation for possible dimensional variations, such as different expansions and contractions between different materials of at least part of the electrodes $12_1$ and $12_2$ and of the heating body 11, in particular between at least the electrical-distribution elements 14 made of metal and the body 11 made of the polymer-based PTC material 11a.

In the case exemplified, the two elements 14 represented both have a distribution portion 14a that extends in the width direction W and a distribution portion 14b that extends in the length direction L, each in the proximity of a respective edge of the corresponding meshed structure 13. Preferentially, but not necessarily, the electrical-connection portions, or the terminals 12a, are defined at the area of joining between the two aforementioned distribution portions 14a and 14b. Obviously, elements 14 of this type may have shapes different from what has been represented by way of example, and include even just one distribution portion.

It goes without saying that also in embodiments of the type described with reference to FIGS. 26-27 the structures 13 may be fixed to the corresponding elements 14 in the ways already described above, for example via welding, and that likewise the structures 13 may be at least partially embedded in the heating body 11 in the ways described above, i.e., via mechanical pressure or else via overmoulding of the material 11a. In the example of FIGS. 26-27, the two electrodes of a heating element 10, preferably electrodes with a dimensional-compensation structure, are located at respective opposite faces of the corresponding heating body 11, in order to bring about a circulation of the electric current substantially in a way perpendicular to the plane of the corresponding face of the heating body 11.

In various embodiments, two electrodes of a heating element 10 are located at one and the same face of the corresponding heating body 11 in order to bring about a circulation of the electric current substantially according to a plane parallel to the plane of the corresponding face of the heating body 11. Such a case is exemplified in FIGS. 28 and 29, where it may in fact be noted how the two electrodes $12_1$ and $12_2$, preferably, but not necessarily, electrodes $12_1$ and $12_2$ comprising a dimensional-compensation structure similar to the one described previously with reference to FIGS. 26-27, are both located at one and the same face of the body 11, with the corresponding structures 13 that are here only partially embedded in the material 11a. Also the two elements 14 exemplified both have a distribution portion 14a that extends inclined in the width direction W, and a distribution portion 14b that extends in the length direction L, each in the proximity of a respective edge of the corresponding meshed structure 13, possibly with a part of each portion 14a that is set directly on top of the material 11a, i.e., without interposition of a corresponding part of the structure 13.

The electrical-connection portions, or the terminals 12a, are here defined at an end of the elements 14, in particular at the end of the portions 14a. Obviously, the elements 14 may have shapes different from the one exemplified, and include even just one transverse or longitudinal distribution portion.

Figure 28:
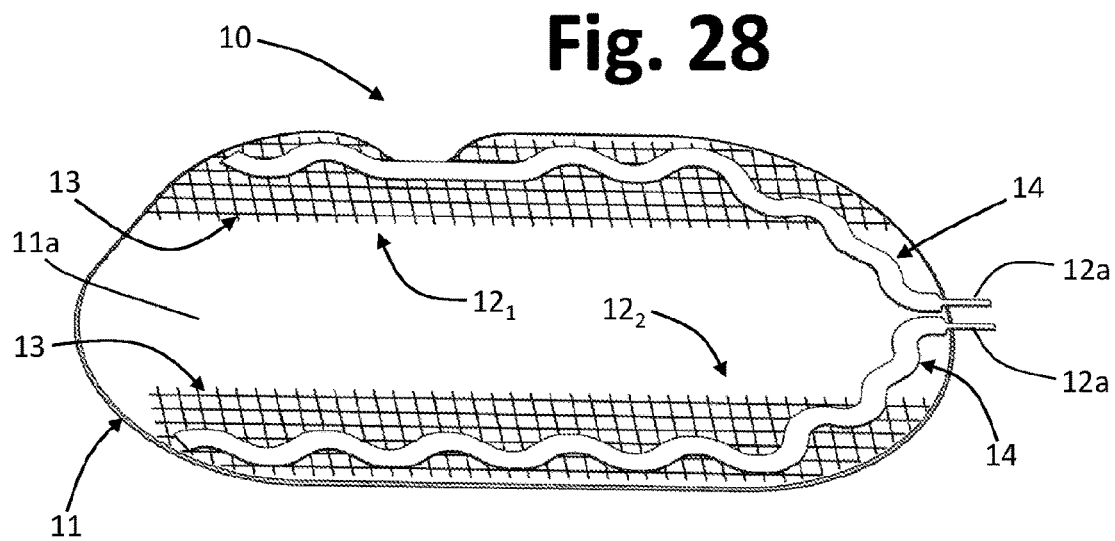
FIGS. 28 and 29 are a schematic perspective view and an exploded schematic view, respectively, of a further heating element according to possible embodiments of the invention.
Figure 29:
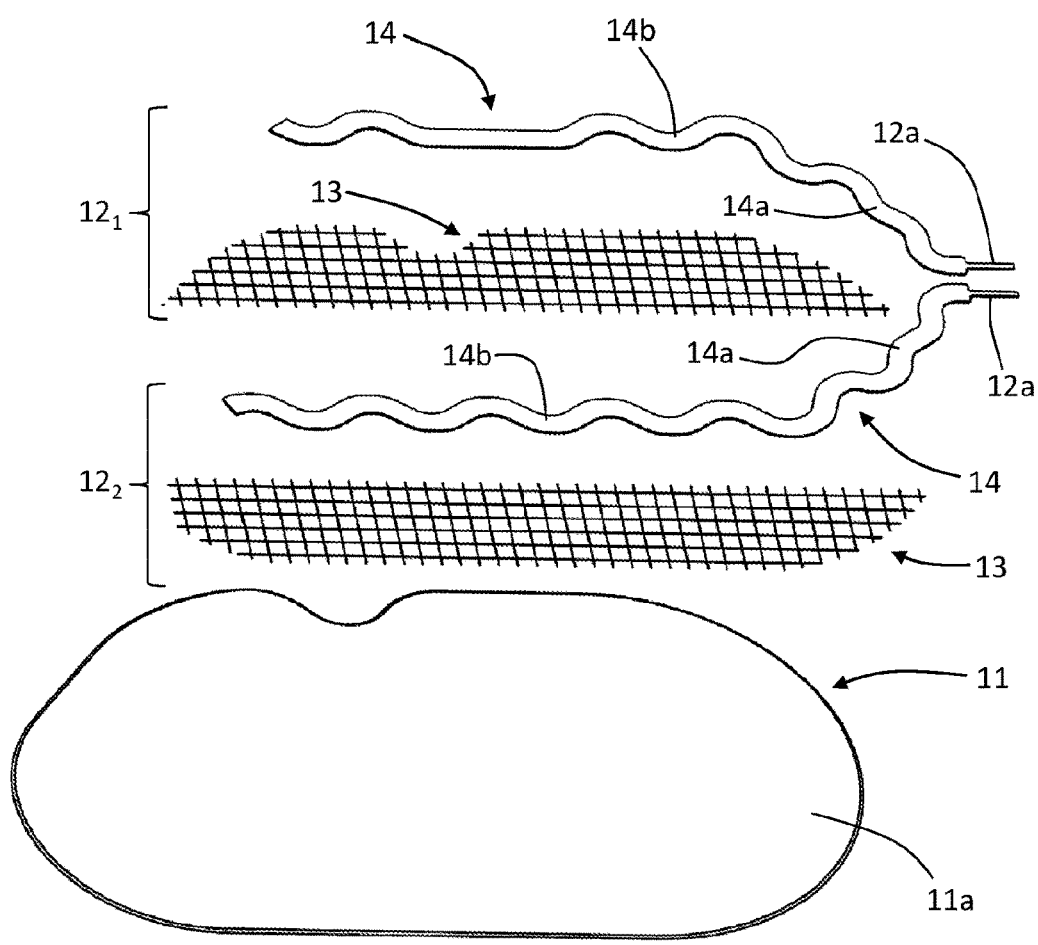

Also in embodiments of the type described with reference to FIGS. 28-29, the structures 13 may be fixed to the corresponding elements 14 in the ways already described above, for example via welding, and the structures 13 may be at least partially embedded in the heating body 11 in the ways described above, i.e., via mechanical pressure or else via overmoulding of the material 11a.

In various embodiments, at least one electrode, or each electrode, of a heating element includes a number of meshed structures 13, which are preferentially electrically connected to one another by way of at least one electrical-distribution element.

Figure 30:
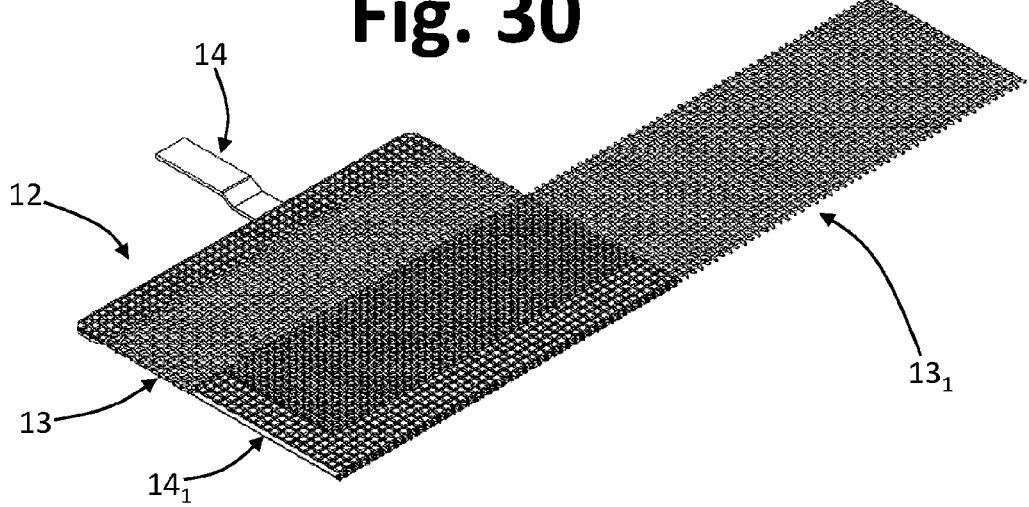
FIGS. 30 and 31 are a schematic perspective view and an exploded schematic view, respectively, of an electrode of a heater device according to possible embodiments of the invention.
Figure 31:
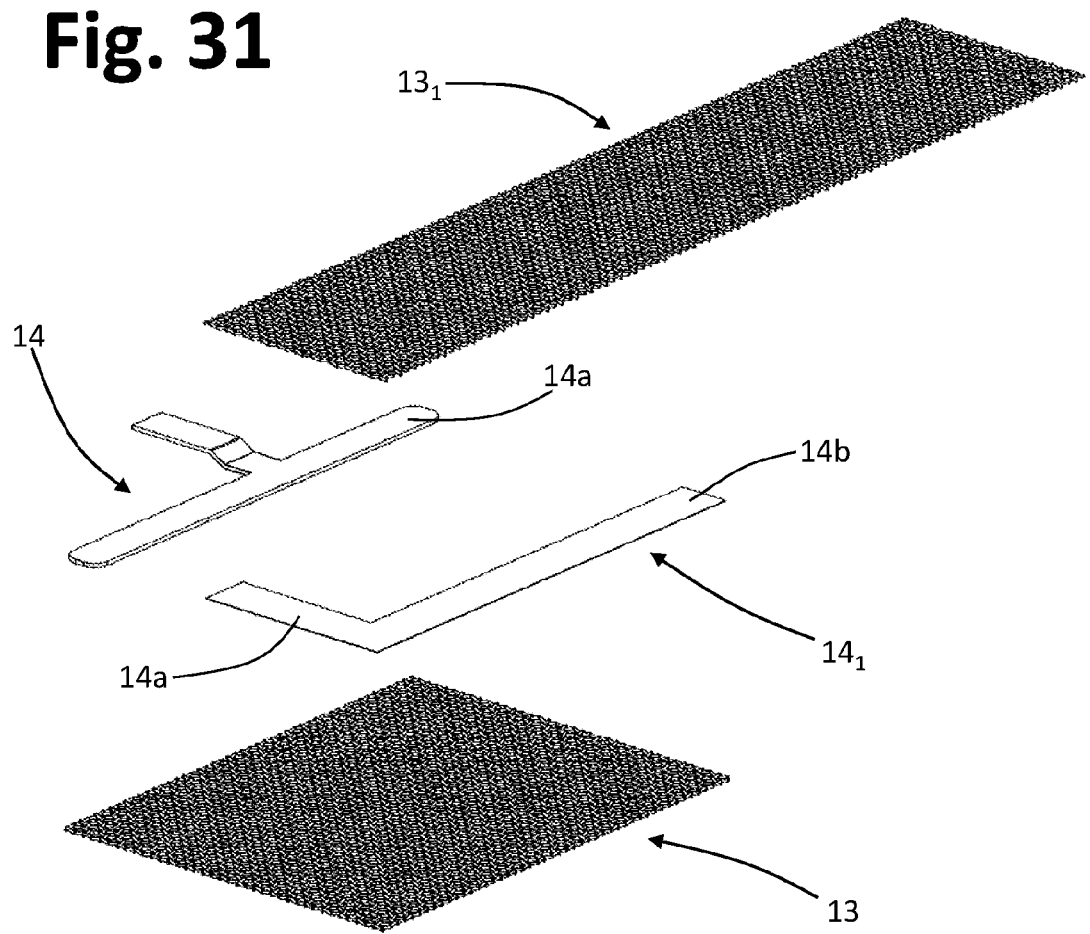

An example of this type is represented schematically in FIGS. 30 and 31, where the electrode designated by 12 has a first meshed structure 13, with associated to it a corresponding electrical-distribution element 14 of the type already represented in part A) of FIG. 6, as well as a second meshed structure $13_1$, which is connected to the first meshed structure 13 via a further distribution element $14_1$, here substantially L-shaped, or having a portion 14a transverse to, and a portion 14b longitudinal with respect to, the second meshed structure $13_1$. The further distribution element $14_1$ is preferentially fixed, in particular welded, between the two structures 13 and $13_1$, in a position intermediate thereto.

As has been said, in various embodiments, a heater device according to the invention may be integrated in a component that also performs functions different from heating of a generic medium, for example, a component of a tank. For such applications, it is evidently not necessary for the heater device to be of a generally arched type, or present one or more arched heating elements; it may, in fact, present one or more straight or planar heating elements, for example as in the aforementioned WO 2017/077477 A. Moreover, one or more planar heaters do not necessarily have to be integrated in a tubular part of such a component.

Figure 32:
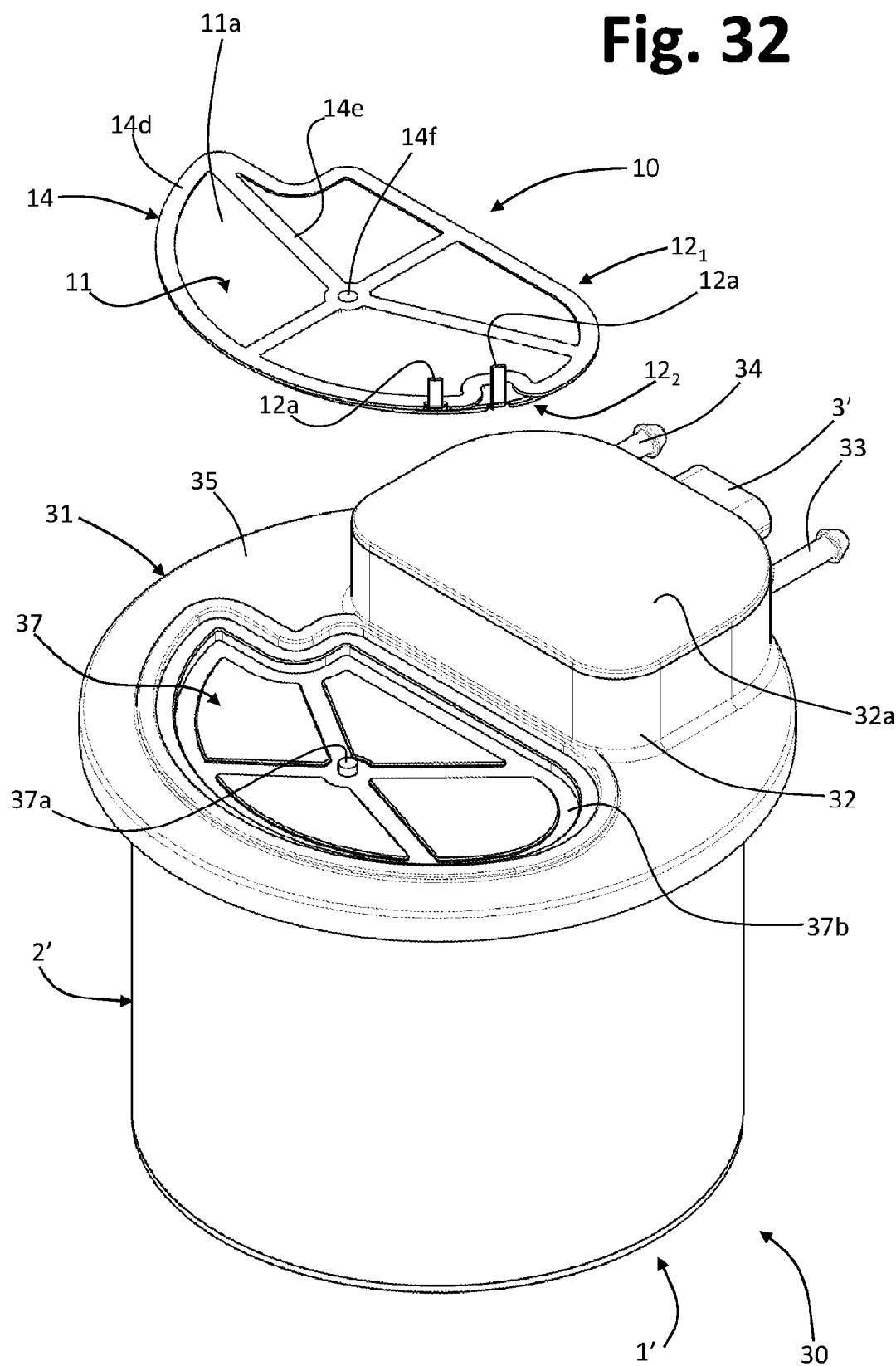
FIG. 32 is a partially exploded view of a motor-vehicle component that integrates at least one heater device according to possible embodiments of the invention.
Figure 33:
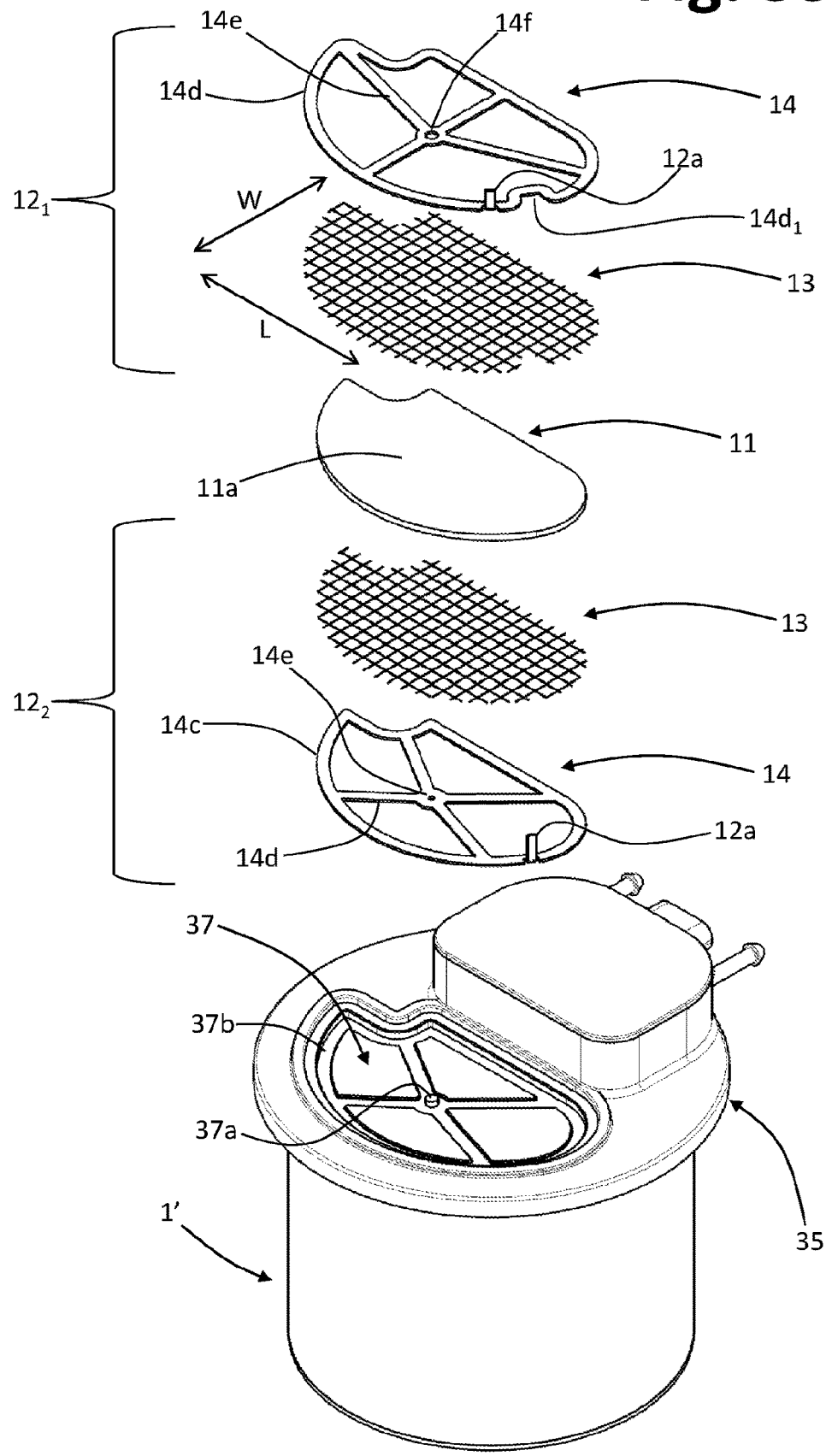
FIG. 33 is a view similar to that of FIG. 32, with a heating element of the heater device represented in exploded view.

Represented, for example, in FIGS. 32 and 33 is a component of the type already designated previously by 30, defined in the base 31 of which is a housing 37 for a straight or planar heating element 10, here having a peripheral profile shaped so as to present curvatures. Also visible in these figures is a lower lid of the base 31—designated by 32a only in FIG. 32—of the type mentioned previously, for closing the box-shaped portion 32. The seat is defined substantially at the transverse wall that defines the containment volume of the component 30 (i.e., the bottom wall of the volume designated by T in FIG. 11).

FIGS. 32 and 33 are likewise useful to illustrate the case of electrodes $12_1$ and $12_2$, the electrical-distribution element 14 of which has a closed or substantially closed, or annular or substantially annular, development. In the example, the distribution elements 14 hence have an annular peripheral portion 14d, which is to extend substantially at or in the proximity of the peripheral edge of the corresponding meshed structure 13. This peripheral portion 14a hence extends both in the longitudinal direction and in the transverse direction of the corresponding structure 13. In various embodiments of this type, the element 14 may also include one or more intermediate distribution portions, for example portions 14e that converge towards a central area 14f of the element 14. In the example, defined at the aforesaid central area 14f is an opening that is designed to couple with a corresponding positioning element 37a defined within the housing 37 of the base 31 of the component 30. Within the aforesaid housing 37 there may also be defined a seat 37b having a profile substantially complementary to that of the distribution element 14 of one of the electrodes, here the electrode $12_2$, in order to contribute further to proper positioning of the heating element 10.

It should be noted that, thanks to the presence of the heating element 10 described, the component 30 of FIGS. 32-33 does not necessarily have to integrate also the heater device designated by 1', even though the presence of both of the heaters 1' and 30 is preferable.

Also in embodiments of this type, the structures 13 may be fixed to the corresponding elements 14 in the ways already described above, for example via welding, and the structures 13 may be at least partially embedded in the heating body 11 in the ways described above, i.e., via mechanical pressure or else via overmoulding of the material 11a. In the case represented in FIG. 32, the structures 13 are completely embedded in the material 11a, but this does not constitute an essential characteristic.

Once again with reference to the example illustrated, the electrical-connection portions of the elements 14, or the terminals 12a of the heating element 10, extend in a direction perpendicular to the plane of the element itself, and for this purpose the peripheral portion 14d of the element 14 of an electrode—here the element 14 of the upper electrode $12_1$—bends inwards ($14d_1$, FIG. 33) or is in any case shaped so as to enable passage of the terminal 12a of the other electrode. As has been mentioned, in any case, the peripheral portion 14d of an electrode does not necessarily have to be closed on itself, it possibly presenting at least one interruption or discontinuity.

As mentioned previously, the meshed structure 13 is preferably formed by the interweaving or criss-crossing of relatively fine filiform elements or threads, preferably having a diameter of between 0.2 mm and 0.02 mm. The use of fine threads makes it possible to obtain an efficient fixing of the structures 13 to the material 11a, also thanks to their at least partial embedding in the aforesaid material, thus countering the risks of detachment between the parts in question.

For instance, threads having a diameter of less than 0.1 mm are advantageous for enabling the threads themselves to be embedded by force into the material 11a, preferably by heating the latter, as explained previously, and this also in the case of small mesh openings, for example even of less than 0.05 mm. Threads having a diameter greater than 0.1 mm may instead be more convenient to use when the material 11a is overmoulded on the structures 13, and it is necessary to have wider mesh openings to enable passage of the material itself, for example mesh openings even larger than 1 mm (in general, in conductive fabrics that can be used for implementation of the invention, corresponding to threads of larger diameter are wider mesh openings).

A thread of relatively large diameter can advantageously be replaced by a number of threads of smaller diameter. For instance, the cross section of a thread having a diameter of 0.14 mm substantially corresponds to that of three threads having a diameter of 0.08 mm: hence, neglecting the skin effect, the passage of electric current that can occur in a thread having a diameter of 0.14 mm can occur in three threads having a diameter of 0.08 mm. If, however, the sum of the circumferences of the three threads with a diameter of 0.08 mm is considered (approximately 0.77 mm), it will be noted that it is almost equal to twice the circumference (approximately 0.44 mm) of the single thread having a diameter of 0.14 mm. It will hence be appreciated that corresponding to the aforesaid larger "overall" circumference of the three finer threads is a larger (almost twice as large) surface of contact between the meshed structure 13 and the material with PTC effect 11a, hence with a better electrical contact and a more extensive total mechanical adhesion between the structure and the material.

From the foregoing description, the characteristics of the present invention emerge clearly, as likewise do its advantages. The electrical heater device according to the invention is built in a way that is as a whole simple, inexpensive, and reliable.

The fact that the electrodes of the heating element of the device include at least a meshed structure at least partially embedded in the material with PTC effect counters the risks of the electrodes separating from or peeling off the material, a phenomenon that is, instead, encountered in the prior art. The fact that the meshed structure is relatively extensive and dense, i.e., formed by relatively fine threads, in any case ensures a wide surface of adhesion and contact between the electrodes and the material with PCT effect, with an optimal distribution and intensity of the current flowing between the electrodes themselves. The presence in the electrode of at least one distribution element prevents undesirable concentrations of electric current on just a few threads of the meshed structure, and hence prevents the risk of melting of the threads themselves, a risk that moreover could be potentially greater given that threads of small cross section are preferably used for achieving a better electrical contact with, and a better mechanical adhesion, to the PTC material.

It is clear that numerous variations may be made by the person skilled in the art to the electrical heater device described by way of example, without thereby departing from the scope of the invention as defined in the ensuing claims.

In the embodiments exemplified previously, the meshed structure 13 of at least one of the electrodes $12_1$ and $12_2$ is embedded or englobed at least in part directly in the material 11a with PCT effect. In other possible embodiments, the structure 13 is instead at least in part embedded or englobed in a further electrically and thermally conductive material that coats at least partially the body 11 in electrical contact therewith, for example a conductive adhesive or a conductive coating layer; in these embodiments, the heating body 11 includes the aforesaid further material, which can hence be exploited to enable mechanical fixing of at least one of the electrodes $12_1$ and $12_2$ to the heating body itself.

As has been seen previously, the methodology of production of an electrical heater device according to the invention envisages fixing an electrical-distribution element 14 to the meshed structure 13 of an electrode. Preferentially, this fixing is carried out—for example via welding—before the meshed structure 13 is associated to the heating body 11, for example by causing forced penetration of the former into the latter or via overmoulding. However, alternatively, it is also possible to associate the meshed structure 13 initially to the heating body 11 in one of the aforesaid ways, and subsequently fix the element 14 to the structure 13. For instance, the meshed structure may be associated to the body 11 allowing at least a part of the former to project from the latter, and then the distribution element 14 is fixed to the aforesaid projecting part of the structure 13.

The invention claimed is:

1. An electrical heater device comprising at least one heating element which includes a first electrode, a second electrode and a heating body that includes a material having a PTC effect in electrical contact with the first electrode and the second electrode, wherein the material having a PTC effect comprises at least a polymer or a polymer-based material,
   wherein each of the first electrode and the second electrode comprises:
      a meshed structure including a plurality of substantially threadlike metal elements which define a plurality of mesh openings, with the meshed structure which has a length and a width, is in electrical contact with the heating body and is at least partially embedded or englobed therein, and
      at least one electrical-distribution element for distributing electric current on the plurality of threadlike metal elements, the at least one electrical-distribution element including a shaped metal strap which is fixed to the meshed structure, the shaped metal strap defining at least one distribution portion that overlaps a corresponding region of the meshed structure and extends in at least one of a length direction and a width direction of the meshed structure,
   wherein the at least one distribution portion defined by the shaped metal strap is welded to respective threadlike metal elements of the plurality of threadlike metal elements at said corresponding region,
   wherein the heating body is a body moulded at least in part over the first electrode and the second electrode, such that part of said polymer or polymer-based material occupies at least a part of said mesh openings, and
   wherein between the first electrode and the second electrode a spacer body is arranged, which is also at least partially embedded or englobed in the material having a PTC effect of the heating body which is moulded over the first electrode and the second electrode.

2. The device according to claim 1, wherein the first electrode and the second electrode each consists of one said meshed structure and said at least one electrical-distribution element.

3. The device according to claim 1, wherein the at least one electrical-distribution element has at least one first distribution portion, which extends in the width direction of the meshed structure, and at least one second distribution portion, which extends in the length direction of the meshed structure, the at least one first distribution portion and the at least one second distribution portion being both defined by the shaped metal strap and welded to respective threadlike metal elements of the plurality of threadlike metal elements.

4. The device according to claim 1, wherein the at least one electrical-distribution element integrally defines at least one electrical-connection terminal that projects beyond a peripheral edge of the meshed structure or of the heating body.

5. The device according to claim 1, wherein:
at least one part of the heating element is substantially arched.

6. The device according to claim 1, further comprising a casing body that covers at least partially the at least one heating element.

7. An electrical heater device comprising at least one heating element that includes a first metal electrode, a second metal electrode and a heating body made at least in part of a material having a PTC effect in contact with the first metal electrode and the second metal electrode, wherein the material having a PTC effect comprises at least a polymer or a polymer-based material,
wherein each of the first metal electrode and the metal second metal electrode consists of:
at least one meshed structure including a plurality of substantially threadlike metal elements which define a plurality of mesh openings, the meshed structure having a length and a width to define an area thereof, and being in electrical contact with the heating body; and
at least one electrical-distribution element for distributing electric current on the threadlike metal elements that form the meshed structure, the at least one electrical-distribution element including a shaped metal strap having a total area amounting to a fraction of the area of the meshed structure and extending in at least one of a length direction and a width direction of the meshed structure;
wherein the shaped metal strap defines at least one longitudinally extending distribution portion which overlaps a corresponding region of the meshed structure and is fixed thereto,
wherein the meshed structure is at least partially embedded or englobed in said polymer or polymer-based material of the heating body,
wherein at least one part of the at least one distribution portion defined by the shaped metal strap is welded to corresponding threadlike metal elements of the meshed structure at said corresponding region,
wherein the heating body is a body moulded at least in part over the first metal electrode and the second metal electrode, such that part of said polymer or polymer-based material occupies at least a part of said mesh openings, and
wherein between the first metal electrode and the second metal electrode a spacer body is arranged, which is also at least partially embedded or englobed in the material having a PTC effect of the heating body which is moulded over the first metal electrode and the second metal electrode.

8. A motor-vehicle component, comprising at least one heater device according to claim 1.

9. The device according to claim 1, wherein the at least one electrical-distribution element has a substantially comb-like shape.

10. The device according to claim 1, wherein the at least one electrical-distribution element has a substantially annular shape.

11. The device according to claim 1, wherein the meshed structure of the first electrode and the meshed structure of the second electrode are both embedded or englobed in said polymer or polymer-based material at one and the same face of the heating body.

12. The device according to claim 1,
wherein the polymer or polymer-based material of the heating body is a co-continuous polymeric composite having a matrix that comprises at least two immiscible polymers and at least one electrically conductive filler in the matrix, one of the immiscible polymers being high-density polyethylene and another one of the immiscible polymers being polyoxymethylene,
wherein the high-density polyethylene and the polyoxymethylene are in relative percentages of between 45% and 55% of their sum in weight, and
wherein the electrically conductive filler is confined the high-density polyethylene, in a weight percentage of between 10% and 45% of their sum in weight.

13. The device according to claim 1, wherein the at least one distribution portion defined by the shaped metal strap is welded to the respective threadlike metal elements substantially throughout the whole length or the whole width of the meshed structure.

14. An electrical heater device comprising at least one heating element which includes a first electrode, a second electrode and a heating body that includes a material having a PTC effect in electrical contact with the first electrode and the second electrode, wherein the material having a PTC effect comprises at least a polymer or a polymer-based material,
wherein each of the first electrode and the second electrode comprises:
a meshed structure comprising a plurality of substantially threadlike metal elements which define a plurality of mesh openings, with the meshed structure which has a length and a width to define an area thereof, is in electrical contact with the heating body and is at least partially embedded or englobed therein, and
at least one electrical-distribution element for distributing electric current on the threadlike metal elements that form the meshed structure, the at least one electrical-distribution element including a shaped metal strap which is fixed to the meshed structure and has a total area amounting to a fraction of the area of the meshed structure,
wherein the shaped metal strap defines a first longitudinally extended distribution portion and a second longitudinally extended distribution portion, which extend perpendicular to each other and overlap corresponding regions of the meshed structure,
wherein the first longitudinally extended distribution portion and the second longitudinally extended distribution portion are both welded to respective threadlike metal elements at said corresponding regions to overlap corresponding portions of the heating body,
wherein the heating body is a body moulded at least in part over the first electrode and the second electrode, such that part of said polymer or polymer-based material occupies at least a part of said mesh openings, and
wherein between the first electrode and the second electrode a spacer body is arranged, which is also at least partially embedded or englobed in the material having a PTC effect of the heating body which is moulded over the first electrode and the second electrode.

\* \* \* \* \*